US008996316B2

(12) United States Patent
Selman et al.

(10) Patent No.: US 8,996,316 B2
(45) Date of Patent: Mar. 31, 2015

(54) SYSTEM AND METHOD FOR FRACTIONATION OF A WELL USING A THREE DIMENSIONAL WELLBORE PROFILE WITH AN EXECUTIVE DASHBOARD

(75) Inventors: Thomas H. Selman, Midland, TX (US); Matthew J. Jennings, Midland, TX (US)

(73) Assignee: Selman and Associates, Ltd., Midland, TX (US)

( * ) Notice: Subject to any disclaimer, the term of this patent is extended or adjusted under 35 U.S.C. 154(b) by 665 days.

(21) Appl. No.: 13/281,419

(22) Filed: Oct. 25, 2011

(65) Prior Publication Data

US 2013/0035863 A1 Feb. 7, 2013

Related U.S. Application Data

(63) Continuation-in-part of application No. 12/879,732, filed on Sep. 10, 2010, now Pat. No. 8,463,550, and a continuation-in-part of application No. 12/879,708, filed on Sep. 10, 2010, now Pat. No. 8,463,549.

(51) Int. Cl.
*G06F 19/00* (2011.01)
*E21B 43/26* (2006.01)
*E21B 43/263* (2006.01)

(52) U.S. Cl.
CPC ............... *E21B 43/26* (2013.01); *E21B 43/261* (2013.01); *G06F 19/00* (2013.01); *E21B 43/263* (2013.01)
USPC ............................................................... 702/9

(58) Field of Classification Search
CPC . G06F 19/00; G06F 17/5004; G06F 17/5081; G06F 3/0346; E21B 3/26; E21B 3/261; E21B 3/263
USPC ............................................................... 702/9
See application file for complete search history.

(56) References Cited

U.S. PATENT DOCUMENTS

2001/0001984 A1* 5/2001 Petegem et al. ............... 166/297
2006/0271299 A1* 11/2006 Ward et al. ......................... 702/6
2009/0090555 A1* 4/2009 Boone et al. .................... 175/45

* cited by examiner

*Primary Examiner* — John Breene
*Assistant Examiner* — Lynda Dinh
(74) *Attorney, Agent, or Firm* — Buskop Law Group, PC; Wendy Buskop

(57) ABSTRACT

A system and computer assisted method to fractionate an oil or other well using a user moveable and rotatable three dimensional model of a lateral pay zone for a directionally drilled well, and other information relative to the lateral pay zone, enabling accurate identification of fractionation zones, accurate placement of well perforating guns, and accurate insertion of fractionation plugs to maximize production of the well, while additionally enabling the three dimensional model of the lateral pay zone to be viewable and updatable by on site uses at the location of the fractionation and by remote users as events occur, in some cases, in providing updates in less than 1 minute.

18 Claims, 14 Drawing Sheets

19

Editing Table [ACTUAL] -

Table Name: [ ] 204

Calculation Method: Minimum Curvature 210

Proposed Azimuth: 149.0 deg 206

Target Angle: 90.0 deg 208

Target TVD: 6632.2 ft 212

Initial Values

TVD: 5824.90 214 VS: 115.70 216 Northing: -162.50 59 Easting: -54.50 220

202 196 198 200

| Tool | MD | Inclination | Azimuth | TVD | SSTVD | VS | N | E | CL | CD | CA | DLS | Build | Walk | BRN | RF |
|---|---|---|---|---|---|---|---|---|---|---|---|---|---|---|---|---|
| Tie In | 5830 | 2.2 | 196.78 | 5824.9 | -4590.90 | 115.70 | -162.50 | -54.50 | 0 | 0.00 | 0.00 | 0.00 | 0.00 | 0.00 | 0.00 | 1.00000000 |
| GYRO | 5859 | 1.5 | 206.1 | 5853.88 | -4619.88 | 111.80 | -163.37 | -54.83 | 29 | 172.33 | 198.55 | 2.62 | -2.41 | 32.14 | 7.17 | 1.00001465 |
| GYRO | 5890 | 2.3 | 172.8 | 5884.87 | -4650.87 | 112.59 | -164.36 | -54.93 | 31 | 173.29 | 198.48 | 4.29 | 2.58 | -107.42 | 7.36 | 1.00004500 |
| GYRO | 5921 | 4.2 | 158.3 | 5915.82 | -4681.82 | 114.28 | -166.03 | -54.43 | 31 | 174.72 | 198.15 | 6.63 | 6.13 | -46.77 | 7.41 | 1.00010726 |
| GYRO | 5951 | 6.2 | 153 | 5945.69 | -4711.69 | 116.98 | -168.49 | -53.29 | 30 | 176.72 | 197.55 | 6.85 | 6.67 | -17.67 | 7.45 | 1.00010719 |
| GYRO | 5981 | 9 | 149.6 | 5975.43 | -4741.43 | 120.94 | -171.96 | -51.37 | 30 | 179.47 | 196.63 | 9.45 | 9.33 | -11.33 | 7.36 | 1.00020402 |
| GYRO | 6012 | 11.7 | 150.9 | 6005.92 | -4771.92 | 126.51 | -176.80 | -48.61 | 31 | 183.36 | 195.37 | 8.74 | 8.71 | 4.19 | 7.29 | 1.00018646 |
| GYRO | 6042 | 14 | 151.7 | 6035.17 | -4801.17 | 133.18 | -182.65 | -45.41 | 30 | 188.21 | 193.96 | 7.69 | 7.67 | 2.67 | 7.28 | 1.00013510 |
| GYRO | 6073 | 16.7 | 151.8 | 6065.06 | -4831.06 | 141.37 | -189.88 | -41.53 | 31 | 194.37 | 192.34 | 8.71 | 8.71 | 0.32 | 7.20 | 1.00018511 |

Save and Close | Save | Close

FIGURE 5

23

168

WELL NAME: PUMA #5
COUNTY: MIDLAND
Geologist: GEORGE JONES email:
Office: 432-555-4321 gjones@selmanlog.com
Cell: 432-555-1234

GEOLOGIST: GEORGE JONES
KB ELEVATION: 1234
Confirm at Rig

Date: 08/29/10

PAYZONES: UPPER TOMMY LOWER TOMMY 170

172 174 178

| FORMATION | TOP | BASE | HEIGHT |
|---|---|---|---|
| FRESHWATER | 254 | 255 | 1 |
| SALT WATER | 376 | 376 | 0 |
| SELMAN SAND | 1734 | 1764 | 30 |
| THOMAS SS | 2822 | 3369 | 547 |
| BRIAN SHALE | 3632 | 4089 | 457 |
| JUSTIN MARKER 1 | 4473 | 4536 | 63 |
| ELLIE SAND | 6234 | 6264 | 30 |
| JODI SHALE | 6377 | 6381 | 4 |
| UPPER TOMMY | 6418 | 6541 | 123 |
| NIKKI SAND | 6484 | 6494 | 10 |
| BASE NIKKI SAND | 6541 | 6591 | 50 |
| LOWER TOMMY | 6591 | 6732 | 141 |
| MATT SPRINGS | 6682 | 6732 | 50 |
| HARD BOTTOM | 6732 | 6824 | 92 |

COMMENTS: TD: 6632

Target Line

*6632 TVD @ 725' VS @ 90 DEG. (+30 -30) 180

L.P. SubSea -5100

SIGNATURE: GEORGE JONES

FIGURE 8

FIGURE 9
Editing Table [PROGNOSED TOPS TABLE] - VERTSEC 3
Table Name: VERTSEC 3
981
Data Entry:
991
SubSea TVD
995
982
984
986
988
992
994
Save and Close
993
Save
997
Close
999
914a
914d
914g
914j

| Formation / Marker Name | Depth | TVD Top | TVD Base | SS TVD Top | SS TVD Base | Thickness |
|---|---|---|---|---|---|---|
| SELMAN SAND | 2144.0 | 2144.0 | 2179.0 | -910.0 | -945.0 | 35.0 |
| JUANITA SHALE | 2179.0 | 2179.0 | 3286.0 | -945.0 | -2052.0 | 1107.0 |
| SELMAN SAND 2 | 3286.0 | 3286.0 | 3788.0 | -2052.0 | -2544.0 | 492.0 |
| MIDLAND SILT MARKER | 3788.0 | 3788.0 | 4042.0 | -2544.0 | -2812.0 | 264.0 |
| MATTHEW SHALE | 4042.0 | 4042.0 | 4499.0 | -2812.0 | -3265.0 | 457.0 |
| BOTTOM OF MATTHEW SHALE | 4499.0 | 4499.0 | 4839.0 | -3265.0 | -3605.0 | 340.0 |
| THOMAS SS | 4839.0 | 4839.0 | 4884.0 | -3605.0 | -3650.0 | 45.0 |
| BASE THOMAS SS | 4884.0 | 4884.0 | 4996.0 | -3650.0 | -3762.0 | 112.0 |
| BRIAN SHALE | 4996.0 | 4996.0 | 5300.0 | -3762.0 | -4066.0 | 304.0 |
| BRIAN MARKER 1 | 5300.0 | 5300.0 | 5330.0 | -4066.0 | -4096.0 | 30.0 |

SYSTEM AND METHOD FOR FRACTIONATION OF A WELL USING A THREE DIMENSIONAL WELLBORE PROFILE WITH AN EXECUTIVE DASHBOARD

CROSS REFERENCE TO RELATED APPLICATIONS

The present application is a continuation-in-part of U.S. patent application Ser. No. 12/879,732 filed on Sep. 10, 2010, entitled "SYSTEM FOR GEOSTEERING DIRECTIONAL DRILLING APPARATUS", and is a continuation-in-part to U.S. patent application Ser. No. 12/879,708 filed on Sep. 10, 2010, entitled "METHOD FOR GEOSTEERING DIRECTIONAL DRILLING APPARATUS." These references are incorporated herein in their entirety.

FIELD

The present embodiments generally relate to a system and computer assisted method to fractionate an oil or other well using a three dimensional model of a lateral pay zone for a directionally drilled well enabling accurate identification of fractionation zones, accurate placement of well perforating guns, and accurate insertion of fractionation plugs to maximize production while the three dimensional model of the lateral pay zone is viewable by remote users and members of the fractionation team

BACKGROUND

A need exists for a system for fractionation that is accurate with regard to formations, placement of fractionation plugs, and insertion locations of well perforating guns.

A need exists for a system that can be manipulated by one or more users connected to a network to view a three dimensional model of the lateral pay zone for planning stages of fractionation of a well bore.

A need exists for a computer assisted method to create an executive dashboard of data for fractionation that can be manipulated by a plurality of users on their client devices.

A need exists for a continuously updatable three dimensional model, updated as events occur that can be viewed over a network, which incorporates a three dimensional model of a well bore profile, a three dimensional model of a lateral pay zone of the well bore, a three dimensional model of fractionation zones, indications of placement areas for well perforating gun locations in three dimensions allowing accurate and safe placement of charges.

The present embodiments meet these needs.

BRIEF DESCRIPTION OF THE DRAWINGS

The detailed description will be better understood in conjunction with the accompanying drawings as follows:

FIG. 5 is a representation of an actual survey usable in creating the stratigraphic cross section usable with the invention.

FIG. 8 is a presentation of a geological prognosis usable in the invention.

Figure 1:
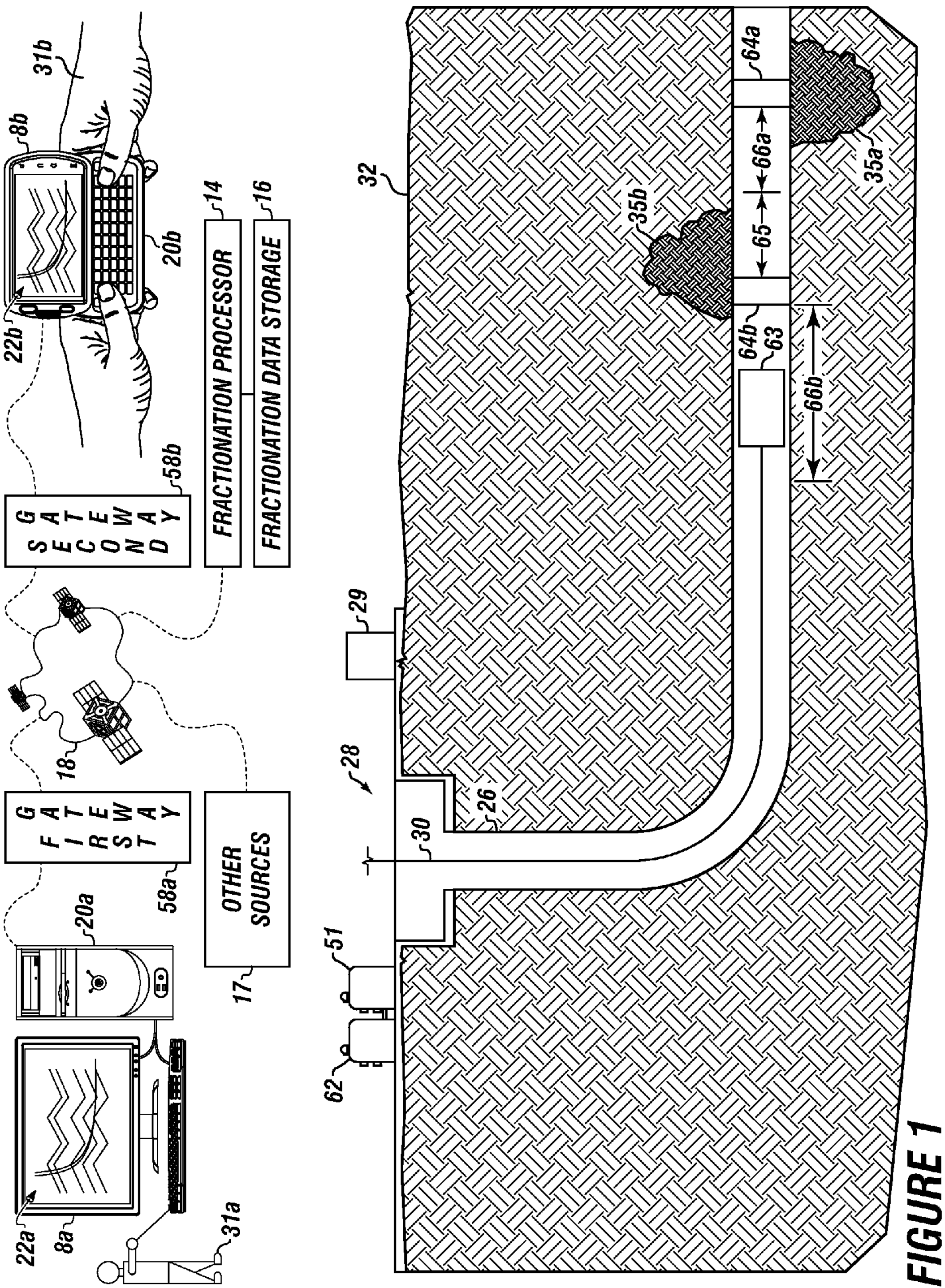
FIG. 1 is an overview of a wellbore with a plurality of fractionation zones and well perforating gun locations identified using the invention.
Figure 2A:
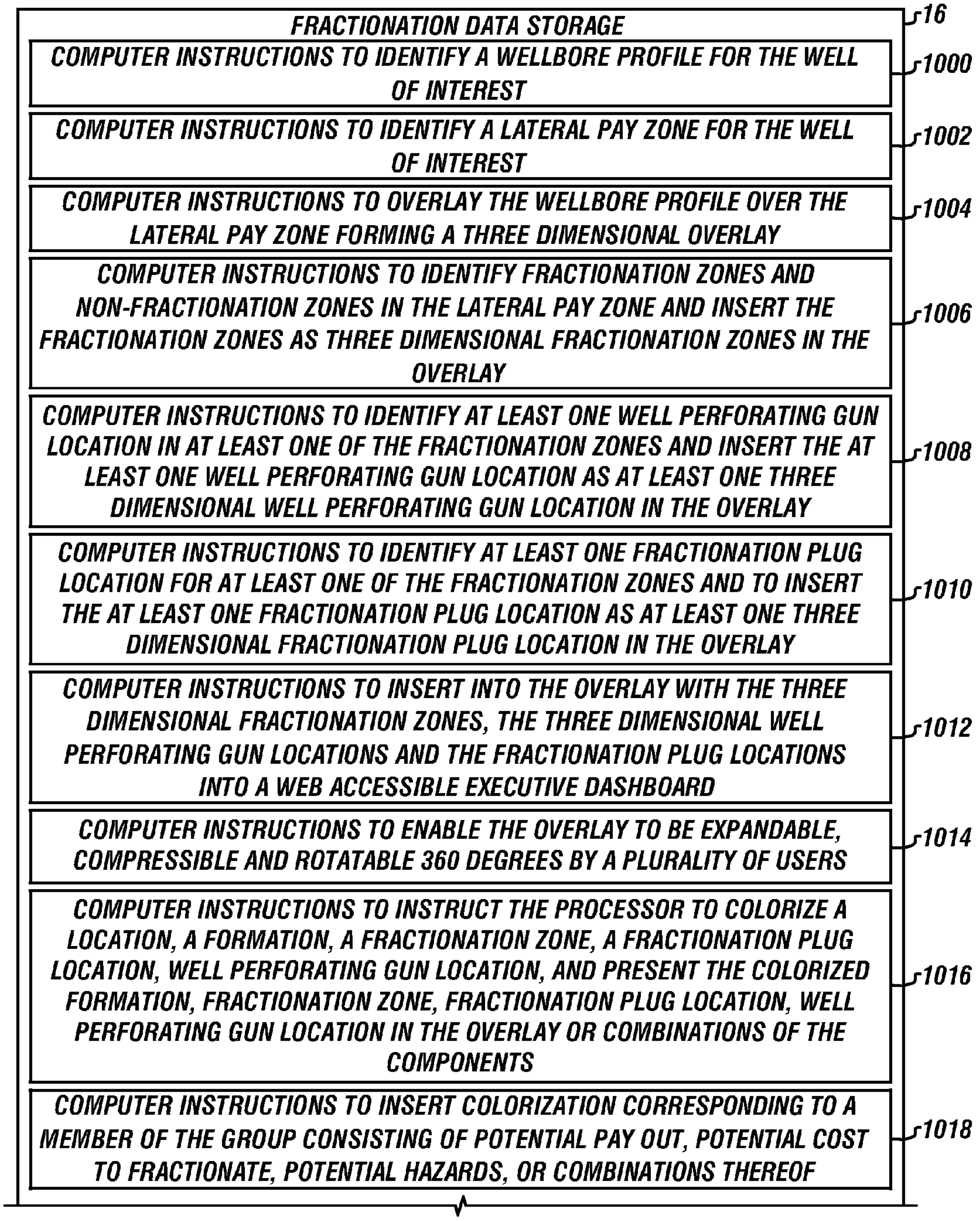
FIGS. 2A-2E depict an embodiment of the fractionation system data storage with the various computer instructions therein.
Figure 2B:
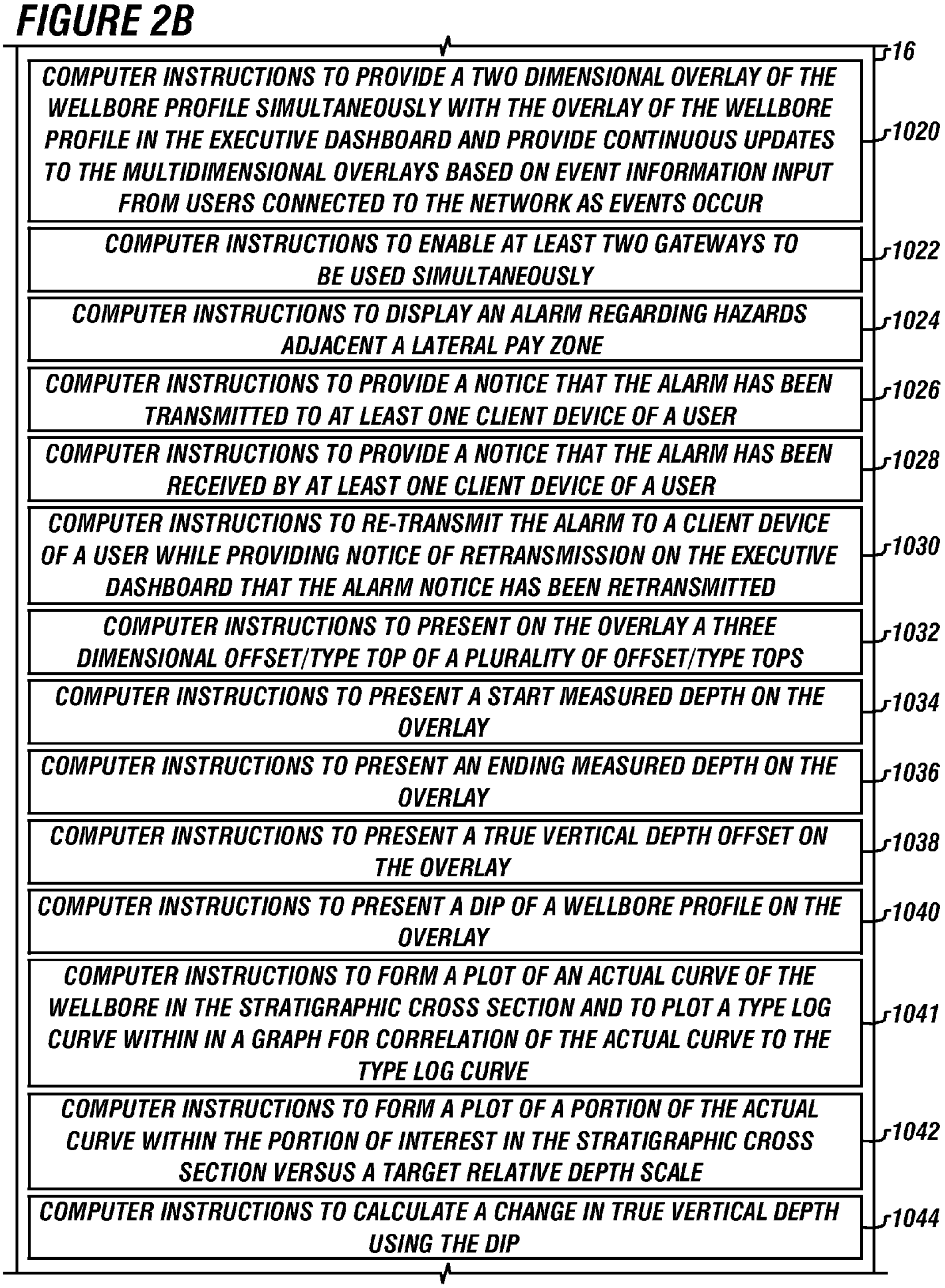
Figure 2C:
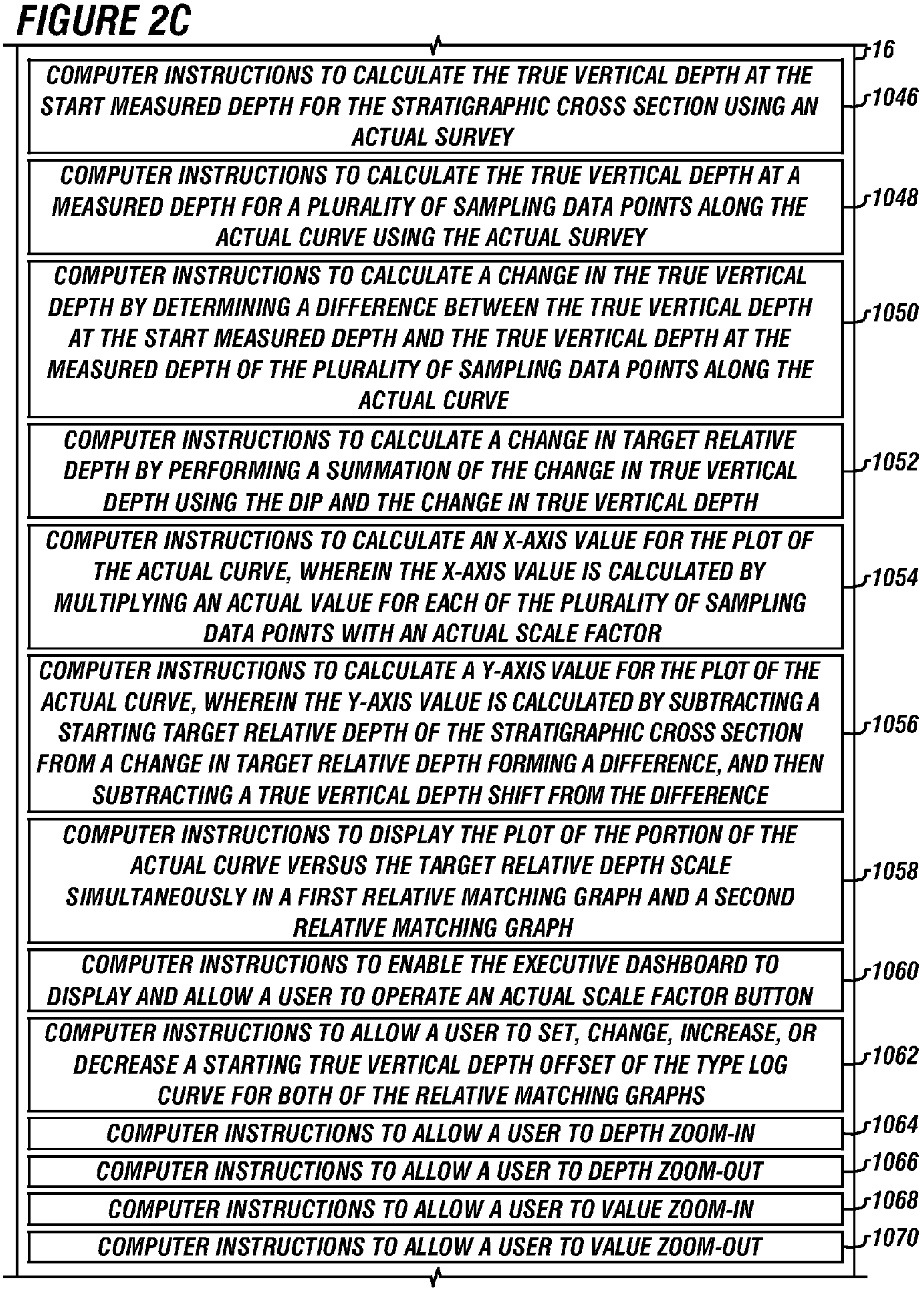
Figure 2D:
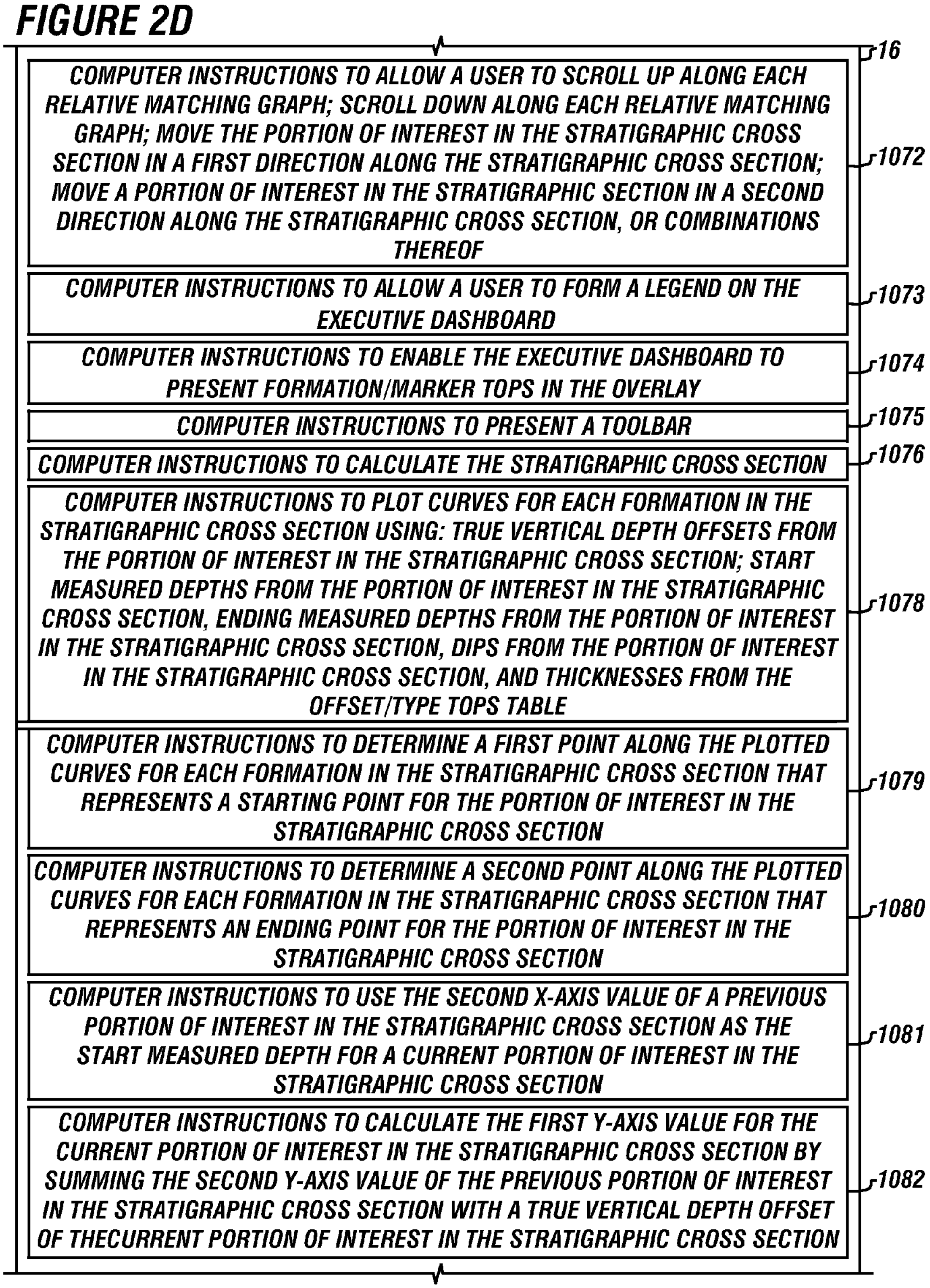
Figure 2E:
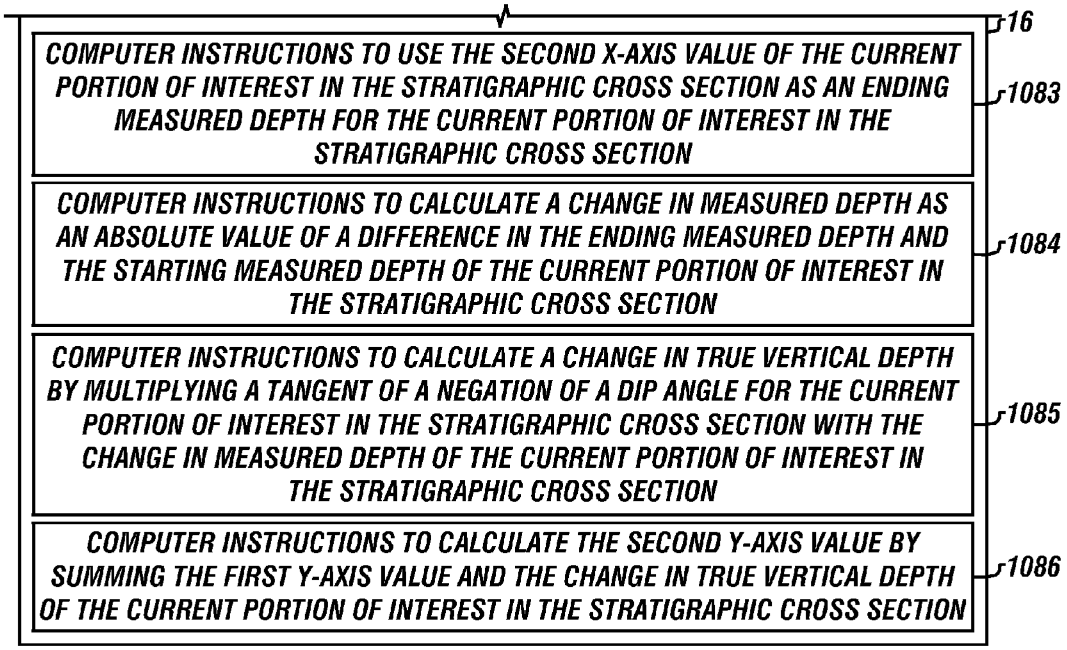

The present embodiments are detailed below with reference to the listed Figures.

DETAILED DESCRIPTION OF THE EMBODIMENTS

Before explaining the present apparatus in detail, it is to be understood that the apparatus is not limited to the particular embodiments and that it can be practiced or carried out in various ways.

The embodiments generally relate to systems and computer assisted methods to fractionate one or more hydrocarbon bearing reservoirs.

The systems and methods can utilize a user moveable and rotatable three dimensional model termed herein "the overlay" of a lateral pay zone for a directionally drilled well.

The systems and methods present the overlay to users via client devices over a network and the overlay is rotatable in 360 degrees by a user on their cell phone, and compressible and expandable for easy viewing.

The systems and methods also present the overlay within an executive dashboard that contains other well information relative to the lateral pay zone.

The executive dashboard is viewable and updatable by users of the system and method as fractionation events occur enabling all users to see what is going on at the production zone in real time, in some cases in only a few seconds.

The executive dashboard with the overlay and other wellbore information also enables accurate identification of fractionation zones, accurate placement of well perforating guns, and accurate insertion of fractionation plugs to maximize production of the well.

The overlay can be viewed and updated remotely and locally, allowing the fractionation team and management to view the overlay with status updates on the lateral pay zone. Accordingly, the management and the fractionation team can make better and safer decisions on where to plug and detonate well perforating guns.

The embodiments of the system allow a wellbore profile, adjacent formations, and associated land rights to be viewed in multiple dimensions. The system can use a wellbore profile created while drilling.

The system can include computer software designed to import and export WITS-compliant information. WITS, as used herein, stands for wellsite information transfer specification.

The computer software can enable a user of the system to receive and send updated fractionation and seismic survey data from a plurality of formats, such as: WITSML, WITS, Log ASCII Standard (LAS), different streaming formats, different logging formats, and other formats installed for use.

The receiving and sending of updated fractionation and seismic survey data from the plurality of formats can occur in real-time, such as in a matter of seconds.

One or more embodiments of the system can be used: in the field adjacent a fractionation site; remote from the fractionation site, such as at an office; at sea on a subsea well site; or simultaneously from various remote and field locations.

The system has an executive dashboard program that can be used to present data to a plurality of users simultaneously and in real-time. The executive dashboard can allow users to simultaneously view numerous pieces of data and information associated with the fractionation.

The system can help users visualize formation structures by allowing users to explore formation structures in three dimensions and in two dimensions, and to explore different segments of a stratigraphic cross section or map simultaneously, thereby allowing the users to determine where a fractionation bit is within a wellbore. The system can therefore be used to avoid disasters associated with formation problems, such as unexpected faults and the like.

One or more embodiments of the system can include a fractionation processor in communication with fractionation equipment and a fractionation system data storage.

The communication can occur through a network. The processor and the data storage can be used to receive and send data to the fractionation team enabling proper placement of well perforating guns, fractionation plugs and use of related fractionation equipment.

The wellbore profile used with the overlay for fractionation includes: an inclination of the wellbore as measured by a directional drilling tool, such as a sensor or gyro; a measured depth of the wellbore, such as a measured depth measured by a depth encoder on a crown of a drilling rig; a tool depth, which can be the measured depth minus the distance of the tool from the bottom of a drill string; an azimuth as measured by a sensor on a directional drilling tool; and actual curve data such as gamma ray readings and resistivity readings as measured by sensors on directional drilling tools.

An executive dashboard with the fractionation information and the overlay can be communicated to client devices in communication with the processor through the network.

The client devices can be computers; mobile devices, such as cellular phones; laptop computers; or another type of client device having communication means, processing means, and data storing means. Each client device can have a processor, a data storage, and a display. The network can be a wireless network, a wired network, or any other type of communications network.

The system can be used to expand an existing wellbore as well as to fractionate an existing wellbore.

The data storage can include a plurality of computer instructions. The data storage can include computer instructions to instruct the processor to create and present the executive dashboard.

The executive dashboard can be presented to a user on a display of the user's client device. The executive dashboard can include a presentation of: a section of a formation, a location of a lateral pay zone, fractionation zones, location for a well perforating gun, location of a fractionation plug and other wellbore information including well name, well location, and contact phone numbers of fractionation team members.

The executive dashboard can present numerous continuously updated data and pieces of information to a single user or simultaneously to a plurality of users connected together over the network. The executive dashboard can provide the users with the ability to continually monitor the fractionation in real-time during the occurrence of the fractionation in order to avoid dangers and environmental problems.

The executive dashboard can be updated in no more than ten seconds after the actual occurrence of an event associated with the data. For example, if the real-time presentation of data includes a location of a fractionation zone, the size of the formation zone can be measured and transmitted to the executive dashboard within ten seconds.

The executive dashboard can enable a user to view portions of interest in a stratigraphic cross section of the wellbore adjacent the lateral pay zone.

The portions of interest in the stratigraphic cross section of the wellbore can be used to correctly identify a location of a fractionation zone within the wellbore.

Various words and phrases can be used herein, for ease of understanding, the following are some of the definitions for terms that will be used herein.

The term "actual survey" refers to a plurality of azimuths for the wellbore, a plurality of inclinations for the wellbore, a plurality of measured depth points for the wellbore, and other data and information associated with an actual survey of the wellbore. The actual survey data can be stored in the data storage using computer instructions, and can be presented within the executive dashboard.

The term "geological prognosis" refers to a geological prognosis on the wellbore site including a prognosed tops table. The geological prognosis can include: at least one depth for at least one formation top, a formation top through which the fractionation zone is expected to impact and other information.

The term "wellbore profile" can refer to the composite visualization of features of the wellbore of interest. Illustrative features can be formation placement, one or more paths of the wellbore, actual curves, and the like.

The term "stratigraphic cross section" refers to a depiction of a formation dipping away from a perpendicular angle from a horizontal plane representing the surface surrounding the wellbore. The stratigraphic cross section can include a depiction of a formation dipping toward the perpendicular angle from the horizontal plane representing the surface surrounding the wellbore.

The stratigraphic cross section can continuously be in both three dimensions and two dimensions.

The "lateral pay zone" refers to the portion of the wellbore to be fractionated and the actual size and shape of the lateral pay zone that can be overlaid and plotted onto the stratigraphic cross section around the wellbore profile.

The term "control buttons" refers to the buttons that a user can manipulate on the executive dashboard. The control buttons can be viewed and operated by users to manipulate the overlay or if a two dimensional overlay is also used, to manipulate either one.

For example, the user can increase or decrease a starting measured depth of the wellbore profile to predict fractionation zones using one or more of the control buttons.

In one or more embodiments, an alarm can be used, such as, an audible alarm, a visual alarm, such as a "red X", an email, a text message, an automated phone call to a user's cell phone or a similar alert.

It can be noted that the wellbore profile that is used with the fractionation uses a wellbore profile superimposed over a formation structure map, and to position the formation structure map behind the lateral pay zone to establish the location of faults in the formation relative to the lateral pay zone or individual fractionation zones. The formation structure map can be imported and/or inputted into the data storage from an external source and saved therein, and can include a calculated stratigraphic cross section before the wellbore has been drilled.

The wellbore profile can be made by superimposing the lateral pay zone over the stratigraphic cross section, and to position the stratigraphic cross section behind the lateral pay zone to establish formations simultaneously both in two dimensions and in three dimensions.

The term "report" as used herein refers to a presentation of some or all of the information imported and/or inputted into the data storage; any information and/or data stored in the data storage; any information and/or data presented within the executive dashboard; any information and/or data included within the various reports described herein; any information and/or data associated with the wellbore, the fractionation equipment, and the fractionation process; or combinations thereof.

The report can include: at least one, and up to several thousand formation names, projected tops of each listed formation, and a true vertical depth as drilled for each formation. The report can include a value representing a difference between a projected top of a formation and a formation top as drilled. The report can include a dip or dip angle, measured in degrees, of a plurality of formations as drilled at the tops of the formations. The report can include each drill angle, measured in degrees. The drill angle can be the angle of inclination of the wellbore at the top of the formation as drilled. For example, the drill angle can be 25.3 degrees.

The report can include identification information. The identification information can include: a job number; a well number; a location in which the wellbore is located, such as a country name, a state name, a county name; a rotary table bushing elevation, such as a kelly bushing elevation; a field name, such as the name of the field where the well was drilled; a start date for fractionation; a start depth for fractionation, such as 1240 feet; an API number, wherein the term "API" refers to American Petroleum Institute; a UWI, wherein the term "UWI" refers to a Unique Well Identifier; a ground level elevation, such as 783 feet; a unit number, such as unit 2 of the Lyon field with 12 units; an end date of fractionation; an end depth of the fractionation, such as 10,700 feet; and other information. The API number can be a unique, permanent, numeric identifier assigned to each well drilled for oil and gas in the United States.

Similarly, the executive dashboard can present buttons to produce reports automatically, as configured by the user. These "report buttons" can provide a report of information imported and/or inputted into the data storage; any information and/or data stored in the data storage; information from fractionation equipment; any information and/or data included within the various reports described herein; any information and/or data associated with the wellbore, the fractionation equipment model numbers, particulate diameters, and associated chemicals used with hydraulic fractionation, and the fractionation process; or combinations thereof.

The executive dashboard can include a report for a wellbore of current information for a zone where a user may want to insert a well perforating gun.

The term "current information" refers to a position selected by a user in the lateral pay zone that then provides at that position a measured depth, such as 10,500 feet, which can be adjustable using an onscreen control button. The current information can also include a formation name, such as "Selman Formation". The formation name can be procured from an offset/type log table that the processor can obtain from communicating with another data storage accessible through the network.

The "current information" can include a "next formation name", for formations that are adjacent the position being viewed by the user. For example, a formation adjacent some rock being indicated by the user, such as be "Juanita Shale", whose name can be obtained from the same or a similar data storage. The next formation name can be the name of the next formation through which the fractionation zone is expected to pass. The current information can include location information for the current formation and for the next formation.

The executive dashboard has many features, besides being able to allow a user to select "current information" or "next formation" information and have the control buttons to rotate and spin the three dimensional wellbore profile with lateral pay zone, the executive dashboard can present, using computer instructions in data storage, a "distance to next formation" from the current formation and the computed distance to next formation to the user within the executive dashboard.

Similarly, the data storage can include computer instructions to instruct the processor to compute an "estimated subsea depth of next formation", such as −7842 feet, and the estimated true vertical depth of the next formation using the wellbore profile information. The estimated subsea depth of next formation can be presented to the user on the executive dashboard.

The wellbore profile includes information on dip angle or current dip of the wellbore. The data storage can include computer instructions to instruct the processor to compute the "current dip or dip angle".

The "current dip" or "dip angle", as the term is used herein, can be the angle of a formation referenced from the horizontal plane representing the surface surrounding the wellbore. In operation, if the angle is positive and the angle points towards the surface or is shallower, the current dip or dip angle can be referred to as "dipping towards" the wellbore; whereas if the angle is negative and the angle points away from the surface or is deeper, the current dip or dip angle can be referred to as "dipping away" from the wellbore.

The "current true vertical depth" is presented with the wellbore information in the executive dashboard. The current true vertical depth can represent the distance measured at the perpendicular angle from the horizontal plane representing the surface surrounding the wellbore to the fractionation zone using a reference point on top of the wellbore.

The term "current subsea true vertical depth" which is presented in the executive dashboard is a true vertical depth that is referenced from sea level, wherein positive numbers can indicate depths that are above sea level and negative numbers can indicate depths that are below sea level.

In one more embodiments, the stratigraphic cross section and/or the portion of interest in the stratigraphic cross section can be calculated using: the offset/type tops section, which can be shown as a thicknesses between lines; the starting measured depths for the stratigraphic cross section of the wellbore; the ending measured depths for the stratigraphic section of the wellbore; the true vertical depth offset for the stratigraphic cross section of the wellbore; and the dip angle for the stratigraphic cross section, which can be shown as an angle of tilt in the formation.

In one or more embodiments, the wellbore profile can be displayed with actual curves, which can be gamma ray curves. The wellbore profile can be displayed with curves that are total gas curves. Total gas can be the volume of gas detected at a particular measured depth. The actual curve can be a curve that includes multiple data points, such as those from a gamma ray analysis or another commonly known analytical method. Each data point can include a magnitude and a depth.

The stratigraphic cross section can be presented on the executive dashboard as a colored and/or visual map prior to importing the actual survey. Within the executive dashboard, different colors can represent different estimated tops of formations and other related data.

In one or more embodiments, the wellbore profile can include and provide a plot of the subsea true vertical depth against the true vertical depth and the measured depth of the wellbore.

The geological prognosis, as the term is used herein, can include a stratigraphic section or map. The stratigraphic section or map can include: at least one identified depth of a formation top, at least one identified depth of a formation bottom, at least one anticline, at least one syncline, at least one depth of a fault, at least one bedding plane between two formations, a fracture line of at least one fault, or combinations thereof.

The geological prognosis can be generated using computer instructions stored in the data storage that instruct the processor to use a surface elevation or a rotary table bushing elevation of a surface for a start of a wellbore, and at least one offset/type top of the projected formation provided by a user.

In one or more embodiments, the actual curves and projected curves can be used as gamma curves from a type log.

In one or more embodiments, a type log can be used as a test well to calculate thicknesses of formations and thicknesses of rock between formations. For example, by calculating an absolute value of the difference between the top true vertical depth of a first formation, such as the Juanita Shale formation, and the top true vertical depth of a second formation, such as the Nikki Sand formation, which, in this example, is the next deepest formation underneath the first formation, the thickness of the Juanita shale formation can be obtained.

In one or more embodiments, the plurality of offset/type tops can include a type log. An illustrative type log for the formation Juanita Shale can be the top true vertical depth value of 1,020 feet, and an illustrative type log for the formation Nikki Sand can be the top true vertical depth value of 1,200 feet.

A user can analyze the wellbore profile to determine portions of the wellbore that are appropriate for perforation, fracing, and/or production stimulation during completion stage operations.

For example, the user can highlight portions of the wellbore within the wellbore profile, such as by using an input device in communication with the executive dashboard.

The data storage can include computer instructions to instruct the processor to configure the executive dashboard to allow the user to highlight portions of the wellbore profile within the executive dashboard. The user can highlight portions to indicate the portions of the wellbore that are appropriate for perforation, fracing, and/or production stimulation. Engineers, at a location remote from the fractionation site can analyze the wellbore profile and highlight portions for further fractionation. Wellbore completion personnel, located at the fractionation site can see those highlighted portions on a presentation of the same executive dashboard and can use the information to perform well completion operations.

The engineers can therefore use the executive dashboard to communicate to drill site personnel which areas within the wellbore to perform further perforation, fracing, and/or production stimulation. The system therefore provides a unique graphical representation and communication means for indicating perforation, fracing, and/or production stimulation areas within a wellbore.

The user can also highlight portions of the wellbore within the wellbore profile to indicate portions of the wellbore that the user has determined are not appropriate for perforating, fracing, and/or production stimulation. For example, a user can identify where a fault is located and can indicate that the area adjacent the fault is not appropriate for perforating, fracing, and/or production stimulation.

For example, the user can highlight portions of the wellbore that are appropriate for perforating, fracing, and/or production stimulation in a first color, and can highlight portions of the wellbore that are not appropriate for perforating, fracing, and/or production stimulation in a second color.

Users of the system can therefore more efficiently implement perforating, fracing, and/or production stimulation in a wellbore without having to perform fracing, and/or production stimulation in areas which are not appropriate for fracing, and/or production stimulation, such as areas wherein an environmental, economic, or safety hazard exists.

In one or more embodiments, a textual report regarding areas appropriate and not appropriate for fracing, and/or production stimulation can be produced. This textual report can be presented in the executive dashboard along with the highlighted portions in the wellbore profile, and can be used in combination with the highlighted portions of the wellbore profile for determinations and communications.

One or more embodiments of the system can be used to perform fractionation of a well using a three dimensional wellbore profile with an executive dashboard.

The method can include identifying a wellbore profile for a wellbore of a well of interest. The wellbore profile can include measured depths, inclinations, azimuths, and gamma ray curves of the wellbore. The wellbore profile can be identified using computer instructions in a fractionation system data storage with a fractionation system processor of a fractionation system, wherein the fractionation system is in communication with a network.

The method can also include identifying a lateral pay zone for the well of interest. The lateral pay zone can be identified using computer instructions in the fractionation data storage.

The method can also include overlaying the wellbore profile over the lateral pay zone forming an overlay of the wellbore profile. The overlay can be formed using computer instructions in the fractionation system data storage.

The overlay can include a three dimensional presentation of a stratigraphic cross section, a three dimensional presentation of formations in the stratigraphic cross section, and a three dimensional presentation of the lateral pay zone in the wellbore profile.

The method can include identifying a fractionation zone and a non-fractionation zone in the lateral pay zone. For example, a user can highlight a fractionation zone in a first color and a non-fractionation zone in a second color.

The method can also include inserting the fractionation zone as a three dimensional fractionation zones in the overlay.

The method can also include identifying a well perforating gun location in the fractionation zones.

The method can further include inserting the well perforating gun location as a three dimensional well perforating gun location in the overlay.

The method can also include identifying at least one fractionation plug location for the fractionation zone. The identification of at least one fractionation plug location for the fractionation zone can be performed using computer instruction in the fractionation data storage.

The method can include inserting the fractionation plug location as a three dimensional fractionation plug location in the overlay. The insertion of the fractionation plug location as a three dimensional fractionation plug location in the overlay can be performed using computer instruction in the fractionation data storage.

The method can further include running a well perforating gun into a well perforating gun location in a fractionation zone identified on the executive dashboard.

The method can also include exploding the well perforating gun.

The method can also include removing the gun from the well.

The method can further include hydraulically pumping particulate and water into the wellbore and fractionating the fractionation zone.

The method can also include placing a fractionation plug into the lateral pay zone at a fractionation plug location identified by the executive dashboard after production begins.

Turning now to the Figures, FIG. 1 is a schematic representation of an embodiment of a fractionation system for fractionation of a wellbore 26.

The fractionation system can include a fractionation processor 14 in communication with a fractionation data storage 16. The fractionation processor 14 can further be in communication with a network 18.

The network 18 can be in communication with one or more client devices 20*a* and 20*b*. A first gateway 58*a* can connect a first client device 20*a* to the network 18, and a second gateway 58*b* can connect the second client device 20*b* to the network 18.

The first client device 20*a* can be associated with a first user 31*a*, which can be a member of the completion team, and the second client device 20*b* can be associated with a second user 31*b*, which can be a member of the production management.

The first client device 20*a* can have a first display 8*a*, and the second client device 20*b* can have a second display 8*b*. The displays 8*a* and 8*b* can present the executive dashboards 22*a* and 22*b*.

The fractionation processor 14 can receive additional data from other sources 17, including data that is inputted and/or imported by users or data from additional data storages.

The executive dashboards 22*a* and 22*b* can present this additional data to the users 31*a* and 31*b*. The fractionation processor 14 can use the received data and additional data to perform calculations and to display the information to allow the users 31*a* and 31*b* to make determinations associated with the fractionation process.

The executive dashboards can allow the users 31*a* and 31*b* to analyze the wellbore profile with the overlay over a lateral pay zone and the additional data, and to provide control commands using control buttons on the executive dashboards.

A well of interest 28 can have the wellbore 26 extending into the earth beneath a surface 32.

A detonator 29 can be located at the surface 32. The detonator 29 can be used to explode the well perforating gun 63. A pump 51 can also be located at the surface 32. The pump 51 can be used to pump fluid into the wellbore 26. The fluid can be particulate, such as sand, water, chemicals, or combinations thereof. The fluid can be used to perform hydraulic fractionation. The fluid can be stored in a fluid source 62 in communication with the pump 51.

A wireline 30 can be used to lower the well perforating gun 63 into the wellbore 26. The well perforating gun 63 can be positioned in a second fractionation zone 66*b*.

The well perforating gun 63 can be positioned in a lateral pay zone adjacent a second formation 35*b* and a first formation 35*a*.

A second fractionation plug location 64*b* can separate the well perforating gun 63 from a non-fractionation zone 65. The non-fractionation zone 65 can be identified in the overlay of the executive dashboard.

A first fractionation plug location 64*a* can be located in the first fractionation zone 66*a*.

FIGS. 2A-2E depict an embodiment of the fractionation data storage 16 with the various computer instructions therein.

The fractionation data storage 16 can include computer instructions to identify a wellbore profile for the well of interest 1000. The wellbore profile can include measured depths, inclinations; azimuths, and gamma ray curves of the wellbore.

The fractionation data storage 16 can include computer instructions to identify a lateral pay zone for the well of interest 1002.

The fractionation data storage 16 can include computer instructions to overlay the wellbore profile over the lateral pay zone forming a three dimensional overlay 1004.

The fractionation data storage 16 can include computer instructions to identify fractionation zones and non-fractionation zones in the lateral pay zone and insert the fractionation zones as three dimensional fractionation zones in the overlay 1006.

The fractionation data storage 16 can include computer instructions to identify at least one well perforating gun location in at least one of the fractionation zones and insert the at least one well perforating gun location as at least one three dimensional well perforating gun location in the overlay 1008.

The fractionation data storage 16 can include computer instructions to identify at least one fractionation plug location for at least one of the fractionation zones and to insert the at least one fractionation plug location as at least one three dimensional fractionation plug location in the overlay 1010.

The fractionation data storage 16 can include computer instructions to insert into the overlay with the three dimensional fractionation zones, the three dimensional well perforating gun locations and the fractionation plug locations into a web accessible executive dashboard 1012. The web accessible executive dashboard can be accessed by a plurality of client devices over the network and can be used to stage the fractionation of the lateral pay zone.

The fractionation data storage 16 can include computer instructions to enable the overlay to be expandable, compressible and rotatable 360 degrees by a plurality of users 1014.

The fractionation data storage 16 can include computer instructions to instruct the processor to colorize a location, a formation, a fractionation zone, a fractionation plug location, a well perforating gun location, and present the colorized formation, fractionation zone, fractionation plug location, well perforating gun location in the overlay or combinations of the components 1016.

The fractionation data storage 16 can include computer instructions to insert colorization corresponding to a member of the group consisting of potential pay out, potential cost to fractionate, potential hazards, or combinations thereof 1018.

The fractionation data storage 16 can include computer instructions to provide a two dimensional overlay of the wellbore profile simultaneously with the overlay of the wellbore profile in the executive dashboard and provide continuous updates to the multidimensional overlays based on event information input from users connected to the network as events occur 1020.

The fractionation data storage 16 can include computer instructions to enable at least two gateways to be used simultaneously 1022. The use of the two industry standard gateways can provide the executive dashboard to different client devices with different client device protocols.

The fractionation data storage 16 can include computer instructions to display an alarm regarding hazards adjacent a lateral pay zone 1024.

The fractionation data storage 16 can include can also include computer instructions to provide a notice that the alarm has been transmitted to at least one client device of a user 1026.

The fractionation data storage 16 can include computer instructions to provide a notice that the alarm has been received by at least one client device of a user 1028.

The fractionation data storage 16 can include computer instructions to re-transmit the alarm to a client device of a user while providing notice of retransmission on the executive dashboard that the alarm notice has been retransmitted 1030.

The fractionation data storage 16 can include computer instructions to present on the overlay a three dimensional offset/type top of a plurality of offset/type tops 1032.

The fractionation data storage 16 can include computer instructions to present a start measured depth on the overlay 1034.

The fractionation data storage 16 can include computer instructions to present an ending measured depth on the overlay 1036.

The fractionation data storage 16 can include computer instructions to present a true vertical depth offset on the overlay 1038.

The fractionation data storage 16 can include computer instructions to present a dip of a wellbore profile on the overlay 1040.

The fractionation data storage 16 can include computer instructions plot an actual curve of the wellbore in the stratigraphic cross section and to plot a type log curve within in a graph for correlation of the actual curve to the type log curve 1041.

The fractionation data storage 16 can include computer instructions to form a plot of a portion of the actual curve within the portion of interest in the stratigraphic cross section versus a target relative depth scale 1042.

The fractionation data storage 16 can include computer instructions to calculate a change in true vertical depth using the dip 1044.

The fractionation data storage 16 can include computer instructions to calculate the true vertical depth at the start measured depth for the stratigraphic cross section using an actual survey 1046.

The fractionation data storage 16 can include computer instructions to calculate the true vertical depth at a measured depth for a plurality of sampling data points along the actual curve using the actual survey 1048.

The fractionation data storage 16 can include computer instructions to calculate a change in the true vertical depth by determining a difference between the true vertical depth at the start measured depth and the true vertical depth at the measured depth of the plurality of sampling data points along the actual curve 1050.

The fractionation data storage 16 can include computer instructions to calculate a change in target relative depth by performing a summation of the change in true vertical depth using the dip and the change in true vertical depth 1052.

The fractionation data storage 16 can include computer instructions to calculate an X-axis value for the plot of the actual curve, wherein the X-axis value is calculated by multiplying an actual value for each of the plurality of sampling data points with an actual scale factor 1054.

The fractionation data storage 16 can include computer instructions to calculate a Y-axis value for the plot of the actual curve, wherein the Y-axis value is calculated by subtracting a starting target relative depth of the stratigraphic cross section from a change in target relative depth forming a difference, and then subtracting a true vertical depth shift from the difference 1056.

The fractionation data storage 16 can include computer instructions to display the plot of the portion of the actual curve versus the target relative depth scale simultaneously in a first relative matching graph and a second relative matching graph 1058. These computer instructions can allow the user to correlate the actual curve to the type log curve thereby forming an actual curve of the wellbore profile for insertion into the overlay.

The fractionation data storage 16 can include computer instructions to enable the executive dashboard to display and allow a user to operate an actual scale factor button 1060. These computer instructions can allow the user to increase or decrease the scale factor of the actual curve for both of the relative matching graphs.

The fractionation data storage 16 can include computer instructions to allow a user to set, change, increase, or decrease a starting true vertical depth offset of the type log curve for both of the relative matching graphs 1062.

The fractionation data storage 16 can include computer instructions to allow a user to depth zoom-in 1064.

The fractionation data storage 16 can include computer instructions to allow a user to depth zoom-out 1066.

The fractionation data storage 16 can include computer instructions to allow a user to value zoom-in 1068.

The fractionation data storage 16 can include computer instructions to allow a user to value zoom-out 1070.

The fractionation data storage 16 can include computer instructions to allow a user to scroll up along each relative matching graph; scroll down along each relative matching graph; move the portion of interest in the stratigraphic cross section in a first direction along the stratigraphic cross section; move a portion of interest in the stratigraphic section in a second direction along the stratigraphic cross section, or combinations thereof 1072.

The fractionation data storage 16 can include computer instructions to allow a user to form a legend on the executive dashboard 1073. The legend can show: a planned wellbore, an actual wellbore, formation names, a current formation name, a next formation name, total gas curves, gamma ray curves, or other curves; or combinations thereof.

The fractionation data storage 16 can include computer instructions to enable the executive dashboard to present formation/marker tops in the overlay 1074.

The fractionation data storage 16 can also include computer instructions to present a toolbar 1075. The toolbar can be configured to provide information to a user. The toolbar can contain a job management menu that allows the user to choose at least one of the following options: new, open from local database, open from file, close, edit job information, save/export job to file, import and/load job file to local database, backup local database, and exit program. The tool bar can include a report generation menu that can allow the user to choose at least one of the following options: create a PDF report or create a rich text format (RTF) report and select additional report options. The tool bar can include a tops button to produce a drop down menu allowing the user to edit type logs and edit prognosed tops tables.

Furthermore, the tool bar can include a survey button that can allow the user to choose at least one of the following: edit a planned survey or edit the actual survey, a stratigraphy button that permits the user to edit stratigraphy adjustments to cause the correlation of the actual curve to the type log curve; a curve button that enables the user to perform editing of continuous curves in the wellbore profile; an update button that allows the user to update data from data sources in a synchronized manner; a configure button that allows the user to select at least one of the following: formations, curves, data sources, data source mappings, alarms, number of days left on a license key, and information on validity of the license key; a help button that allows the user to type questions and receive answers based on key words within the questions.

The fractionation data storage 16 can include computer instructions to calculate the stratigraphic cross section 1076. These computer instructions can provide the stratigraphic cross section that has multiple curves representing tops of formations through which the wellbore has traversed.

The fractionation data storage 16 can include computer instructions to plot curves for each formation in the stratigraphic cross section using: true vertical depth offsets from the portion of interest in the stratigraphic cross section; start measured depths from the portion of interest in the stratigraphic cross section, ending measured depths from the portion of interest in the stratigraphic cross section, dips from the portion of interest in the stratigraphic cross section, and thicknesses from the offset/type tops table 1078.

The fractionation data storage 16 can include computer instructions to determine a first point along the plotted curves for each formation in the stratigraphic cross section that represents a starting point for the portion of interest in the stratigraphic cross section 1079.

The fractionation data storage 16 can include computer instructions to determine a second point along the plotted curves for each formation in the stratigraphic cross section that represents an ending point for the portion of interest in the stratigraphic cross section 1080. A portion of interest in the stratigraphic cross section can represent a formation within the portion of interest in the stratigraphic cross section. A first point of interest can have a first X-axis value and a first Y-axis value, and second point of interest can include a second X-axis value and a second Y-axis value.

The fractionation data storage 16 can include computer instructions to use the second X-axis value of a previous portion of interest in the stratigraphic cross section as the start measured depth for a current portion of interest in the stratigraphic cross section 1081.

The fractionation data storage 16 can include computer instructions to calculate the first Y-axis value for the current portion of interest in the stratigraphic cross section by summing the second Y-axis value of the previous portion of interest in the stratigraphic cross section with a true vertical depth offset of the current portion of interest in the stratigraphic cross section 1082.

The fractionation data storage 16 can include computer instructions to use the second X-axis value of the current portion of interest in the stratigraphic cross section as an ending measured depth for the current portion of interest in the stratigraphic cross section 1083.

The fractionation data storage 16 can include computer instructions to calculate a change in measured depth as an absolute value of a difference in the ending measured depth and the starting measured depth of the current portion of interest in the stratigraphic cross section 1084.

The fractionation data storage 16 can include computer instructions to calculate a change in true vertical depth by multiplying a tangent of a negation of a dip angle for the current portion of interest in the stratigraphic cross section with the change in measured depth of the current portion of interest in the stratigraphic cross section 1085.

The fractionation data storage 16 can include computer instructions to calculate the second Y-axis value by summing the first Y-axis value and the change in true vertical depth of the current portion of interest in the stratigraphic cross section 1086.

Figure 3:
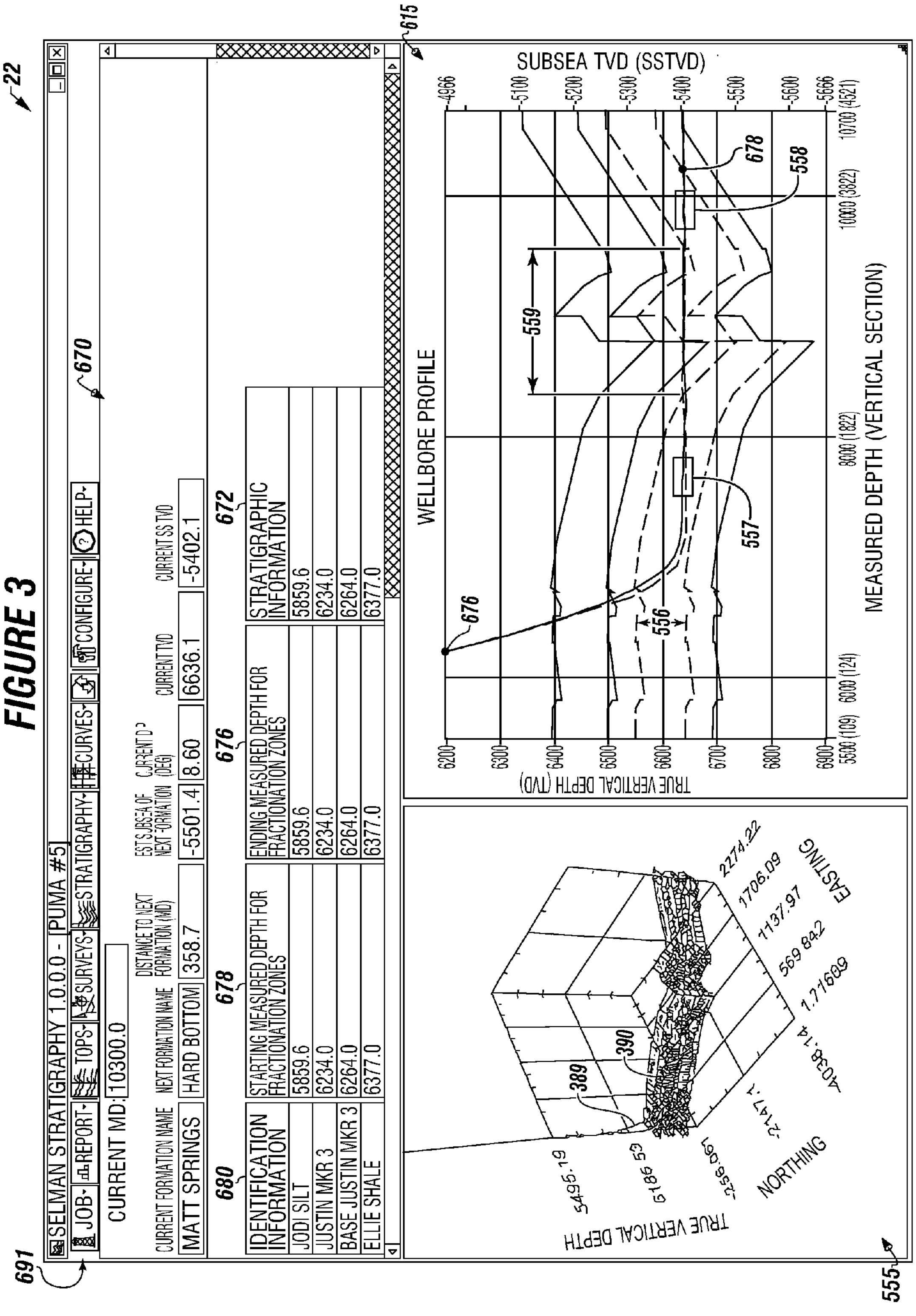
FIG. 3 is a partial diagram of a display of the executive dashboard used for fractionation according to one or more embodiments.

FIG. 3 shows a partial view of an executive dashboard usable for fractionation can be a composite visualization that presents a wellbore profile.

The executive dashboard 22 can display an overlay 555. The overlay 555 can have an actual curve 389 and formation tops 390.

A two dimensional overlay 615 can be adjacent the overlay 555. The two dimensional overlay 615 can have a start depth 676 and an end depth 678. Although not shown, the start depth 676 and the end depth 678 can alternatively be displayed on the overlay 555. In one or more embodiments the start depth 676 and the end depth 678 can be displayed on the overlay 555 and the two dimensional overlay 615 simultaneously. Other information, such as formations tops, actual wellbores, fractionations zones; and the like, can be displayed on the two dimensional overlay 615, the overlay 555, or combinations thereof.

The executive dashboard 22 can also have wellbore information 670 under a toolbar 691.

The executive dashboard 22 can display a plot of fractionation zones 556, plot of perforating gun locations 557, plot of non-fractionation zones 559, and plot of fractionation plug locations 558. The plot of fractionation zones 556, perforating gun locations 557, non-fractionation zones 559, and fractionation plug locations 558 can be displayed on the two dimensional overlay 615, as shown, the overlay 555, not shown, or combinations thereof.

The executive dashboard 22 can also display stratigraphic information 672. The stratigraphic information 672 can be for portions of the wellbore and associated formations surrounding the lateral pay zone.

The executive dashboard 22 can display start measured depths for fractionation zones 676.

The executive dashboard 22 can display end measured depths for fractionation zones 678.

The executive dashboard 22 can display identification information 680. The identification information can be a well location, a well name, and a completion team.

Figure 4:
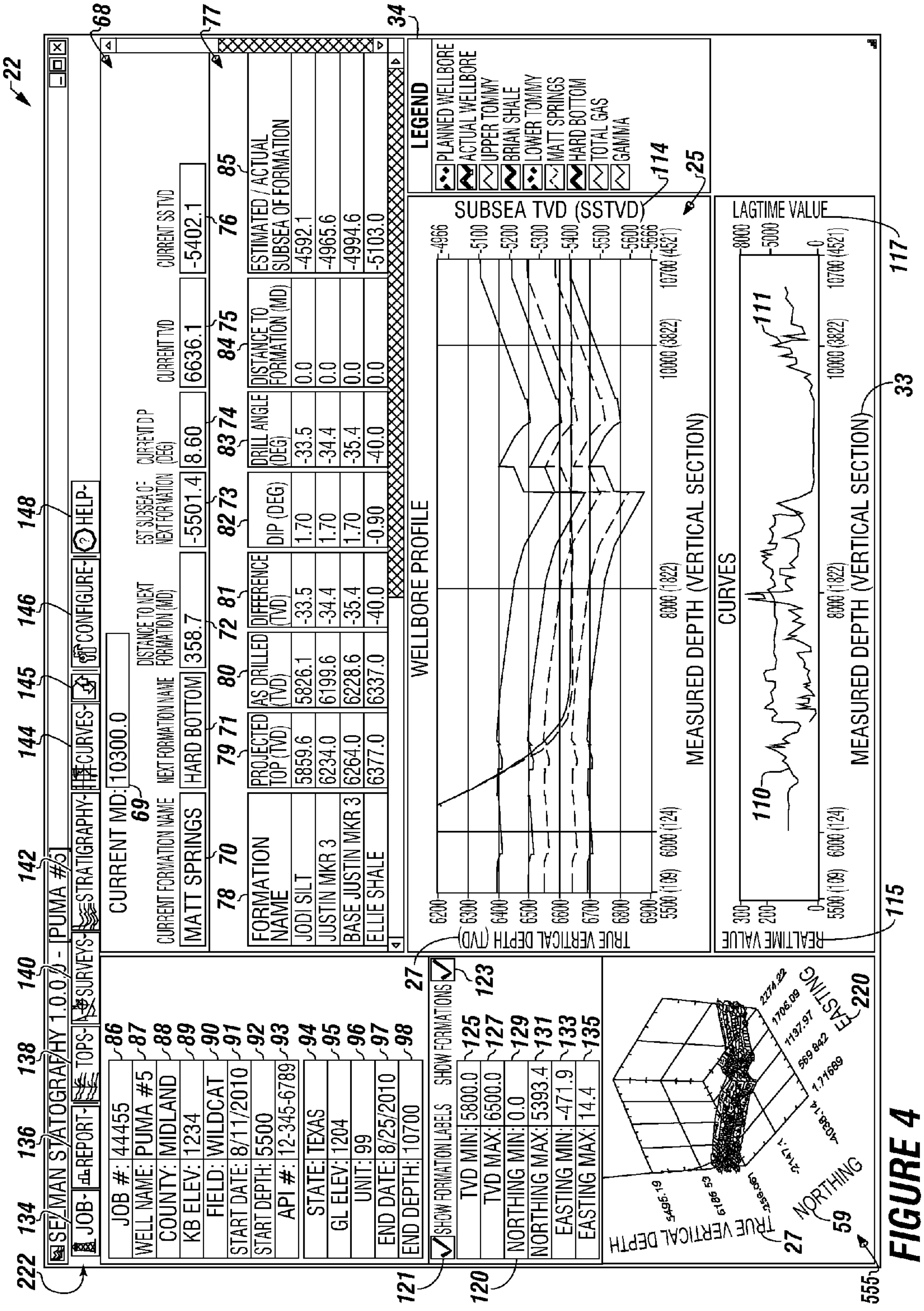
FIG. 4 is an executive dashboard presenting the information with a three dimensional overlay that enables a user to identify fractionation zones and placement of well perforating guns and fractionation plugs.

FIG. 4 shows a detail of the additional report elements 120 which include show formation labels check box 121; show formations check box 123; minimum true vertical depth (TVD) scale control 125; maximum true vertical depth scale control 127; minimum northing scale control 129; a maximum northing scale control 131; a minimum easting scale control 133; a maximum easting scale control 135; and combinations thereof.

The executive dashboard 22 can be a composite visualization that presents a wellbore profile 25. The wellbore profile 25 can include true vertical depths (TVD) 27 and for subsea drilling, subsea true vertical depths (SSTVD) 114. Both true vertical depths are plotted with respect to measured depths 33.

The true vertical depths 27 for the wellbore profile 25 are shown here ranging from 6,200 feet to 6,900 feet. The measured depth 33 of the wellbore profile 25 is shown here ranging from 5,500 feet to 10,700 feet. The subsea true vertical depths 114 of the wellbore profile are shown here ranging from −4,966 feet to −5,666 feet. Any variation of feet for a given formation can be used.

The toolbar 222 can include a curve button 144 that enables the user to perform editing of continuous curves used in the wellbore profile 25, such as the gamma ray curve 110 and the total gas curve 111. For example, the user can add values versus measured depths in a table that produces the continuous curves of the wellbore profile.

The toolbar 222 can include an update button 145 that allows the user to update data from data sources which includes information from the data storage in a synchronized manner.

The toolbar 222 can include a configure button 146 that allows the user to select at least one of the following: formation to configure, curve to configure, data source to reference for mapping, a map for inserting data from a selected data source, alarm to configure, view a quantity of days left on a license key of an analytic tool usable for wellbore profiling, and view information on the validity of a license key. For example, the user can select the formation option and can then configure a formation set of data by adding formations to the formation set, removing one or more formations from the formation set, configuring line styles, line thicknesses, and line colors of formations in the formation set, or combinations thereof.

The toolbar 222 can include a help button 148 that allows the user to type questions and receive answers based on key words within the user's questions.

The toolbar 222 can include a job management menu 134 that allows a user to choose at least one of the following options: new, open from local database, open from file, close, edit job information, save/export job to file, import and/load job file to local database, backup local database, and exit program.

The toolbar 222 can include a report generation menu 136 that allows the user to choose at least one of the following options: create a PDF report or create a rich text format report (RTF report) and select additional report options.

The toolbar 222 can include a tops button 138 that can produce a drop down menu allowing the user to edit a type log tops and edit a prognosed tops table.

The toolbar 222 can include a survey button 140 that allows the user to choose at least one of the following: edit a planned survey or edit an actual survey. For example, a planned survey can include the kick off point for a proposed wellbore, a landing point for the proposed wellbore, and a target true vertical depth for the proposed wellbore.

The toolbar can include a stratigraphy button 142 that permits the user to edit stratigraphy adjustments to adjust the fitting/correlation of the actual curve, such as a gamma ray curve 110 and total gas curve 111, such as a type log gamma ray curve. The stratigraphy button 142 allows editing of the estimated formation structure map by a user.

The executive dashboard 22 can display report header information, including: a job number 86 shown as 44455; a well name or number 87, shown as PUMA #5; a county 88, shown as Midland; a kelly bushing elevation 89, shown as 1234; a field name 90, shown as WILDCAT; a start date for drilling 91, shown as Aug. 11, 2010; a start depth for drilling 92, shown as 5500 feet; an American Petroleum Institute (API) number 93, shown as 12-345-67890 which is a unique number for a well drilled in the United States; a state in which the drilling occurs 94, shown as Texas; a ground level elevation 95, shown as 1204; a unit number 96, shown as having a value 99; an end date of drilling 97, shown as Aug. 25, 2010; and an end depth of the drilling 98, shown as 10700 feet. Additional report elements 120 can also be shown.

FIG. 4 shows that the executive dashboard 22 can include current information 68, which can include: a current measured depth 69, shown as 10,300.0 feet; a current formation name 70, such as MATT SPRINGS; a next formation name 71, such as HARD BOTTOM; a distance to next formation 72, show as 358.7 feet; an estimated subsea depth of next formation 73, shown as −5,501.4 feet; a current dip angle of the formation 74, shown as 8.60 degrees; a current true vertical depth 75, shown as 6,636.1 feet; and a current subsea true vertical depth 76, shown as −5,402.1 feet.

In FIG. 4, the executive dashboard 22 can include a formation transition report 77, which can include: at least one formation name 78, such as JODI SILT; at least one projected formation top 79 of the formation associated with the formation name, such as 5859.6; at least one true vertical depth as drilled 80, shown as 5826.1; at least one difference 81 between a projected formation top and an as drilled top, shown as −33.5; at least one dip 82 for a top of a formation as drilled, shown as 1.70; at least one drilled angle 83 of the wellbore at a top of a formation, shown as −33.5; at least one distance to formation 84, shown as 0.0; and at least one estimated/actual subsea formation depth 85 relative to sea level for a top of a formation, shown as −4592.1. The distance to formation 84 can be a distance to the next formation or a distance to a selected formation.

The executive dashboard 22 can include a legend 34 which identifies the planned wellbore curve, the actual wellbore curve, formation names, a total gas curve, and a gamma ray curve.

The gamma ray curve 110 can be formed by plotting a real-time value 115, here shown with a range from 0 to 300, against the measured depth 33 of the wellbore, here shown ranging from 5,500 feet to 10,700 feet.

The total gas curves 111 can be formed by plotting a lag time value 117, shown as ranging from 0 to 8,000, against the measured depth 33 of the wellbore.

The executive dashboard 22 can present the overlay 555 of a projected path for a drill bit simultaneously as superimposed over the stratigraphic cross section.

The overlay 555 can include northing 59 as the "y" axis, easting 220 as the "x" axis, and true vertical depth 27 as the "z" axis.

Each portion of the executive dashboard 22 can be presented simultaneously to a plurality of users with client devices over a network, providing for constant monitoring and increased safety during drilling operations.

In an embodiment, the information for the executive dashboard can be updated with only two clicks, based on events. If the events occur quickly, then the dashboard can be updated in only a few seconds, such as from about three seconds to about five seconds, or updated daily if the gamma ray is only updated daily. If the user is connected to streaming gamma ray, then the updating can be automatically without clicking.

In an embodiment, the system can show the information in color for fast understanding. Namely, the graphic representations can show the tops for the formations as green markers, the bottom of the target formation can be red, particular named formations such "Eagleford Shale" can be color coded blue or yellow, brown, black, and the curves for the wellbore path can be dashed lines, or solid lines, the wellbore path can change color as the wellbore path passes through specific formations. A hot gamma ray path can be red, and a cold gamma ray path can be blue to easily identify the hot zone versus the cold zone.

FIG. 5 is a representation of an actual survey 19 usable in the system. The actual survey 19 can include: a measured depth column 196; an inclination 198; an azimuth 200; a tool type 202; such as a gyroscope, a survey table name 204; a proposed azimuth 206, such as 149.0 degrees; a target angle 208, such as 90 degrees; a calculation method 210, such as the minimum curvature method; a target true vertical depth 212, such as 6632.2; an initial value true vertical depth 214; an initial value vertical section 216; a northing 59, and an easting 220.

As an example, in one or more embodiment of the actual survey 19, calculations will not be performed in the first line of the actual survey; rather, initial values will presented here, such as: starting points, the TVD is 5824.90, the vertical section, the northing, and the easting.

The actual survey 19 can include exemplary survey points. The exemplary survey points can include the measured depths at which the actual survey is being or has been conducted, such as at 5890 feet. The actual survey 19 can show that the survey is using a gyro tool, as depicted in the tool type 202 column. For example, the gyro tool can measure the inclination as 2.3 degrees from vertical, and the azimuth can be a compass direction at 172.8 degrees when at a depth of 5890 feet. The actual survey 19 can include a save and close button, a save button, and a close button which can function the same as those described for the offset/type table described herein.

Figure 6:
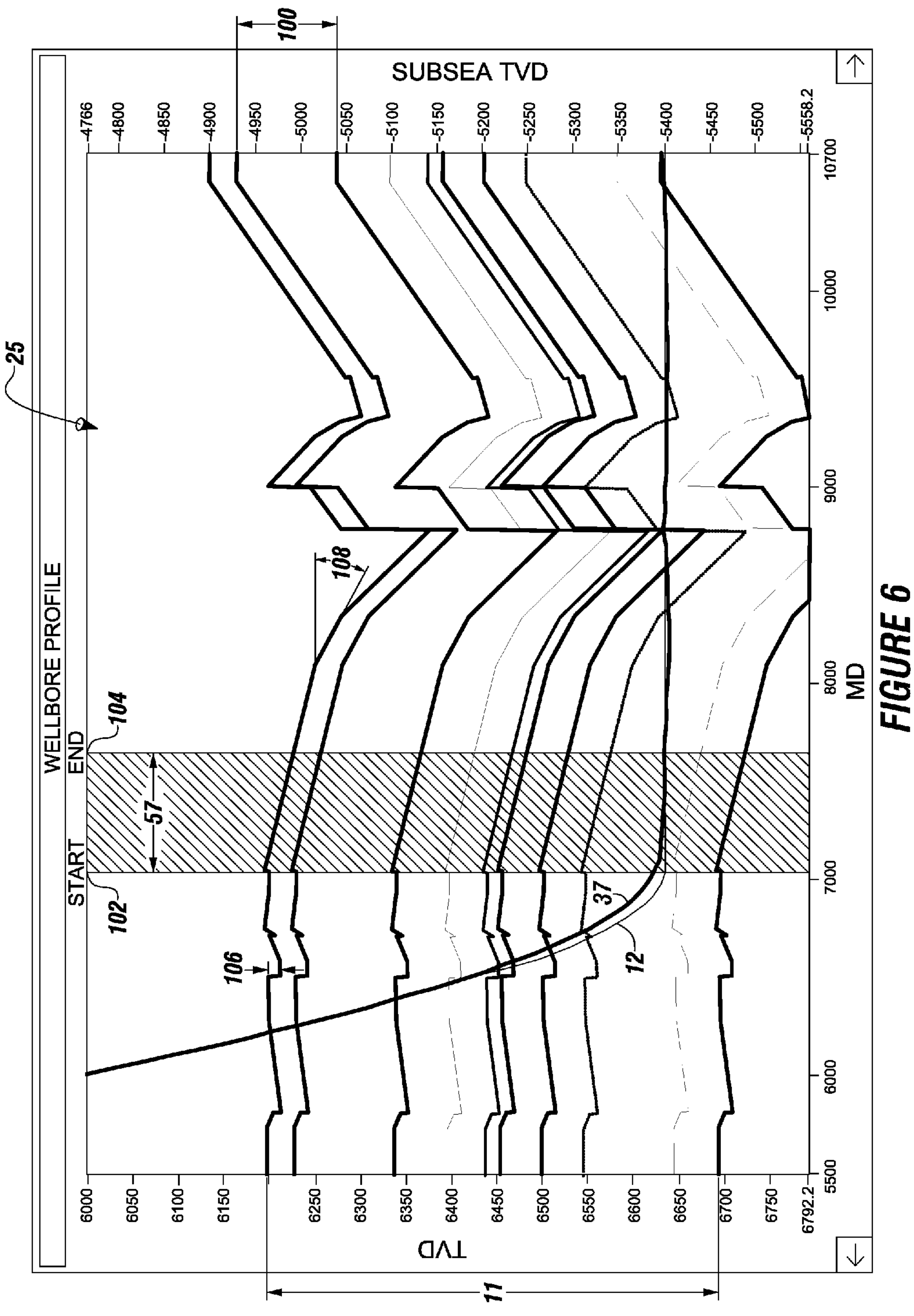
FIG. 6 is a detailed view of the stratigraphic cross section usable in the executive dashboard.

FIG. 6 is a detailed view of a stratigraphic cross section 11 for the wellbore profile 25. The stratigraphic cross section 11 can include: a projected path 12 for a drilling bit, an actual path 37 for the drilling bit, a true vertical depth offset 106 for the stratigraphic cross section of the wellbore, a dip angle 108 for the stratigraphic cross section, which is shown in this Figure as a dip away that is approximately a 30 degree angle.

The stratigraphic cross section 11 can include: one of the tops sections thickness 100 through which the projected path will follow, a starting measured depth 102 for a stratigraphic section 57 of the wellbore, and an ending measured depth 104 for the stratigraphic section 57.

The stratigraphic cross section 11 can display formations. The formations can be identified hydrocarbon bearing formations.

Figure 7:
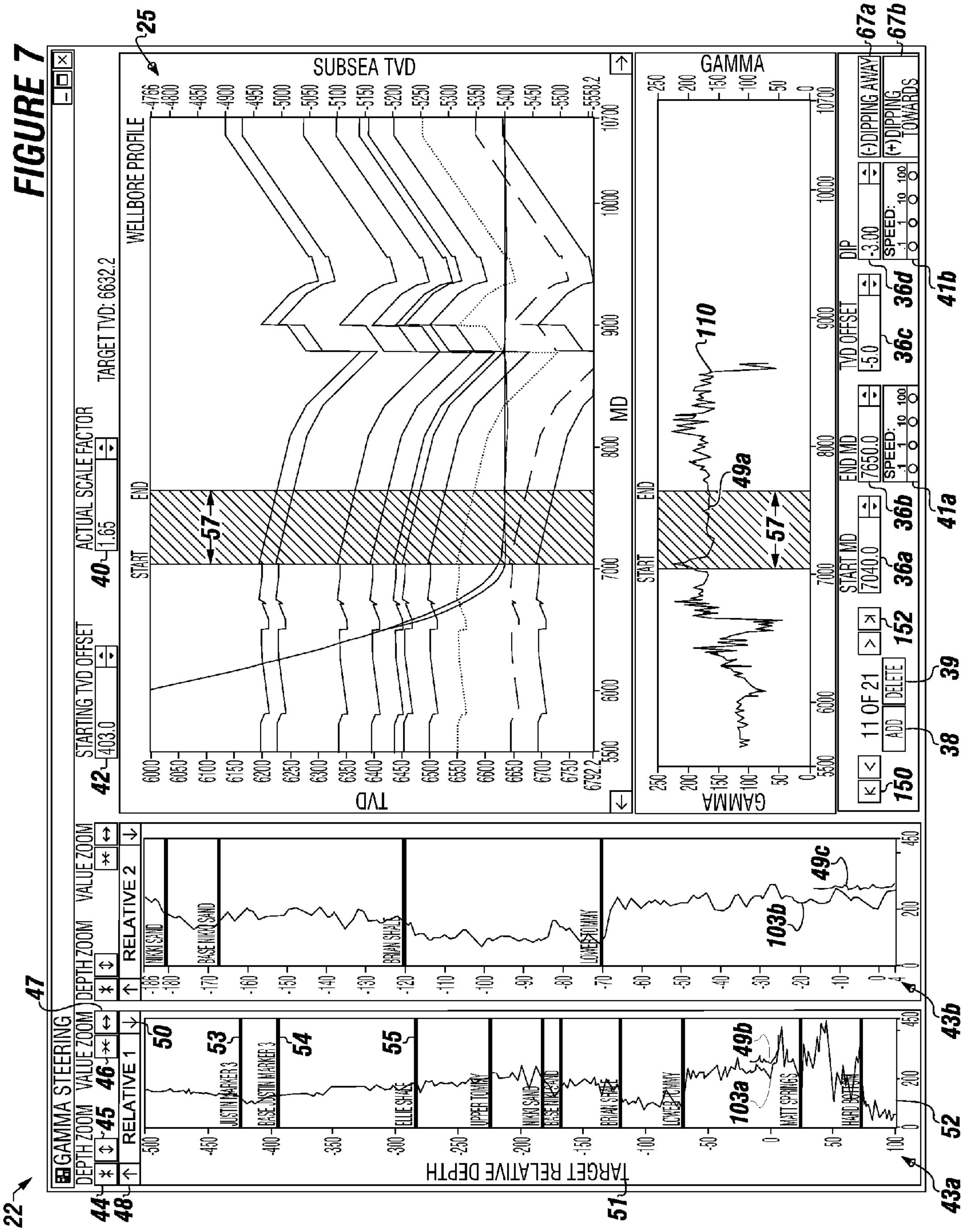
FIG. 7 is another representative executive dashboard usable to view a wellbore profile needed to fractionate a lateral pay zone.

FIG. 7 depicts an embodiment of an executive dashboard 22 that can be used to identify a lateral pay zone. The executive dashboard 22 can have a plurality of control buttons that can be presented to a user. The user can manipulate the buttons using an input device. For example, the user can manipulate the buttons by clicking a mouse over the buttons.

The control buttons can include: a control button 36*a* to manipulate a starting measured depth, a control button 36*b* to manipulate an ending measured depth, a control button 36*c* to manipulate a true vertical depth offset, and a control button 36*d* to manipulate a dip or dip angle in degrees. For example, the user can increase values, decrease values, or replace a value with a new value using the control buttons.

A first indicator 67*a* to identify dipping away from the projected path of the drill bit, and a second indicator 67*b* to identify dipping towards the projected path of the drill bit are depicted.

Additional navigation controls can be presented to the user, including a first navigation control 150 for moving the portion of interest in the stratigraphic section 57 in a first direction along the stratigraphic cross section, and a second navigation control 152 for moving portion of interest in the stratigraphic section 57 in a second direction along the stratigraphic cross section. In one or more embodiments, the navigation controls can have "double" arrows for moving a user to the end or start of a stratigraphic cross section.

The executive dashboard 22 can have additional buttons 44,45,46,47, 48, and 50 that can be used to manipulate a first relative matching graph 43*a* and a second relative matching graph 43*b*.

The additional control buttons include an actual scale factor button 40 that can be used to increase or decrease a scale value of the actual curves for both of the relative matching graphs, such as the gamma ray curves and the total gas curves.

The executive dashboard 22 can include a starting true vertical depth offset control button 42 to set, change, increase, or decrease a starting true vertical depth offset of a type log curve for both of the relative matching graphs.

The additional controls for the relative matching graph 43*a* can include the control button 44 for each of the relative matching graphs that can be used for depth zoom-in and the control button 45 for each of the relative matching graphs that can be used for depth zoom-out. For example, a user can use a depth zoom-in to examine the curve values in more detail to achieve a better or desired curve fit.

The control button 46 for each of the relative matching graphs that can be used for value zoom-in. The control button 47 for each of the relative matching graphs that can be used for value zoom-out, and the control button 48 for each of the relative matching graphs that can be used to scroll up along the relative matching graph 43*a*. For example, a user can use a value zoom-out button to examine the curve from a macro perspective rather than in detail.

The control button 50 for each of the relative matching graphs is also used to scroll down along the relative matching graph 43*a*. For example, the user can use control button 50 to view different portions of the relative matching graph. The relative matching graph 43*b* can have the same additional control buttons, which are not labeled in this figure.

The relative matching graphs can be formed by plotting the target relative depth scale 51 versus the value scale 52. The target relative depth scale 51 can be a true vertical depth scale that is relative to the target true vertical depth. For example, if the target true vertical depth is 6632 feet, this target true vertical depth can be set as a zero on the target relative depth scale 51, such that a value of −100 feet on the target relative depth scale 51 would represent 6532 feet in terms of true vertical depth, and a value of 50 feet on the target relative depth scale 51 would represent 6682 feet in terms of true vertical depth. The value scale 52 can be a real-time value of the actual curves and type log curves, such as the gamma ray curves and other curves.

The relative matching graph 43*a* can include: the first formation/marker top 53, the second formation/marker top 54, and the third formation/marker top 55. In operation, a user can use the two relative matching graphs to view two separate views of the actual curve overlaid onto the type log curve, thereby simultaneously viewing a macro and a micro view of the curve fit.

The executive dashboard 22 can include additional control buttons, which can be disposed below the plot of the actual curves, such as the gamma rays curve 110, which are disposed below the wellbore profile 25. For example, the executive dashboard 22 can include an add control button 38 to add a stratigraphic section to the wellbore profile, and delete control button 39 to delete a stratigraphic section to the wellbore profile. For example, the user can add a stratigraphic section representing the measured depths of the wellbore starting at 7040 feet and ending at 7650 feet to the wellbore profile 25. The executive dashboard 22 can include a control button to set speed control 41*a* for depth and a control button to set speed control 41*b* for dip, which can each be used to adjust a rate of change of the other controls of the executive dashboard 22.

The wellbore profile 25 and the plot of the actual curves, such as the gamma ray curve 110, can include a portion of interest in the stratigraphic section 57. A portion of the actual curve 49*a* within the portion of interest in the stratigraphic section 57 can be plotted within each of the relative matching graphs 43*a* and 43*b*, shown as 49*b* and 49*c*, along with the type log curves 103*a* and 103*b*.

In operation, the user can add stratigraphic sections using the control buttons. Then, for each stratigraphic section, the user can adjust a width of the portion of interest in the stratigraphic section. Then, for each stratigraphic section, the user can then adjust true vertical depth offset and the dip or dip angle using the control buttons such that the actual curve overlays the type log curve to achieve the highest degree of fit/correlation between the two curves as is possible. Adjusting the true vertical depth offset in the actual curve changes the vertical shift of the actual curve as plotted. Adjusting the dip or dip angle of the actual curve changes the thickness, shape, and direction of the actual curve as plotted.

FIG. 8 is presentation of a geological prognosis 23 usable in the invention. The geological prognosis 22 can include: header information 168, payzones 170, formation information 172, top depths of formations 174, base depths of formations 178, and a target line 180.

For example, the header information 168 can include information about the wellbore including contact information, identifying information for the wellbore, and other information. The payzones 170 can also be referred to as target objectives, project objectives, zones of interest, and formations of interest. The formation information 172 can include formation names, formation markers, markers, and annotated points of interest. The target line 180 can include the target true vertical depth, the target angle, and a range above and below the target depth forming a target zone. The top depths of formations 174 can be true vertical depths or measured depths. The base depths of formations 178 can be true vertical depths or measured depths.

Figure 9:
FIG. 9 is a representation of an offset/type table usable in the invention.

FIG. 9 is a representation of an offset/type table 15 usable in the system, including a table identifier 981 that identifies the type log tops being stored in the offset/type table.

The offset/type table 15 can include rows and columns of data. A first column of data 982 can include a formation marker name. The first column of data 982 can include a plurality of offset/type tops of a projected formation, including offset/type top 914*a*, offset/type top 914*d*, offset/type top 914*g*, and offset/type top 914*j*.

The offset/type table 15 can include: top depths of formations column 984, such as depth 2114.0 feet for the Selman Sand formation.

The offset/type table 15 can include a true vertical depth tops column 986, which can be 3788.0 for the Midland Silt Marker formation.

The offset/type table 15 can include a true vertical depths base column 988, such as 4884.0 for the Thomas SS formation.

The offset/type table 15 can include a subsea true vertical depth tops column 990, such as −4066.0 for the Brian Marker 1 formation.

Additionally the offset/type table 15 can include a subsea true vertical depth base column 992, such as −945.0 for the Selman Sand formation, and a thickness of formation column 994, such as 264.0 for the Midland Silt Marker formation.

The offset/type table 15 can have a first selector button 991 that allows a user to enter a true vertical depth into the top depths of formations column 984. A second selector button 995 can allow a user to enter a subsea true vertical depth into the top depths of formations column 984.

The offset/type table 15 can have three storage buttons including a save and close button 993 that can be used to save data that has been edited in the offset/type table 15 to the fractionation data storage 16 of FIG. 1, and saves the presented template of the offset/type table 15, and can remove the offset/type table 15 from the display. A save button 997 can be used to save the data that has been edited in the offset/type table 15 to the fractionation data storage 16. A close button 999 can be used to close a present template of offset/type table 15, and to remove the template from the display.

Figure 10:
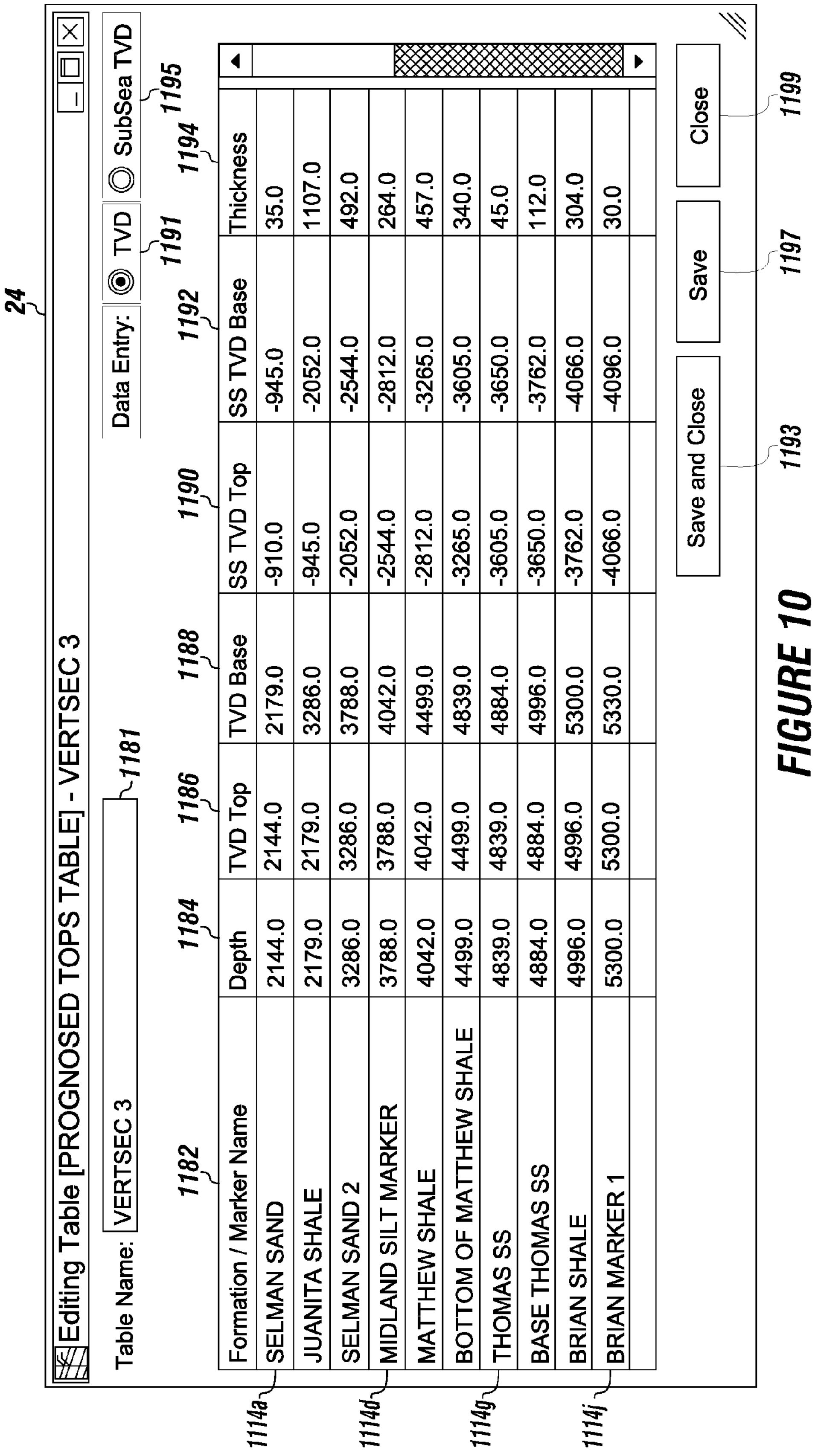
FIG. 10 is an embodiment of a prognosed tops table usable in the invention.

FIG. 10 depicts an embodiment of a prognosed tops table 24.

The prognosed tops table 24 can include the table identifier 1181 that identifies the type log tops being stored in the prognosed tops table 24.

The prognosed tops table 24 can include rows and columns of data. A first column of data 1882 that includes formation/marker names. The first column of data 1182 can include a plurality of offset/type tops of a projected formation, including offset/type top 1114*a*, offset/type top 1114*d*, offset/type top 1114*g*, and offset/type top 1114*j*.

The prognosed tops table 24 can include: top depths of formations column 1184, such as depth 2144.0 feet for the Selman Sand formation.

The prognosed tops table 24 can include a true vertical depth tops column 1186, which can be 3788.0 for the Midland Silt Marker formation.

The prognosed tops table 24 can include a true vertical depths base column 1188, such as 4884.0 for the Thomas SS formation.

The prognosed tops table 24 can include a subsea true vertical depth tops column 1190, such as −4066.0 for the Brian Marker 1 formation.

Additionally the prognosed tops table 24 can include a subsea true vertical depth base column 1192, such as −945.0 for the Selman Sand formation, and a thickness of formation column 1194, such as 264.0 for the Midland Silt Marker formation.

The prognosed tops table 24 can have a first selector button 1191 that allows a user to enter a true vertical depth into the top depths of formations column 1184. A second selector button 1195 can allow a user to enter a subsea true vertical depth into the top depths of formations column 1184.

The prognosed tops table 24 can have three storage buttons including a save and close button 1193 that can be used to save data that has been edited in the prognosed tops table to the data storage, and saves the present template of the prognosed tops table, and can remove the prognosed tops table 24 from the display. A save button 1197 can be used to save the data that has been edited in the prognosed tops table 24 to the data storage, such as fractionation data storage 16, as shown in FIG. 1. A close button 1199 can be used to close the prognosed tops table 24, and to remove the prognosed tops table from the display.

While these embodiments have been described with emphasis on the embodiments, it should be understood that within the scope of the appended claims, the embodiments might be practiced other than as specifically described herein.

What is claimed is:

1. A system for fractionation of a well using a three dimensional wellbore profile comprising:

a computer instructions identifying a wellbore profile of adjacent formations for a wellbore of a well of interest, wherein the wellbore profile of adjacent formations comprises measured depths, inclinations, azimuths, and gamma ray curves of the wellbore;

b computer instructions in the fractionation system data storage identifying a lateral pay zone for the well of interest;

c computer instructions in the fractionation system data storage overlaying the wellbore profile of adjacent formations over the lateral pay zone forming an overlay, wherein the overlay comprises:

(i) a three dimensional presentation of a stratigraphic cross section;

(ii) a three dimensional presentation of formations in the stratigraphic cross section; and (iii) a three dimensional presentation of the lateral pay zone and the wellbore profile of adjacent formations;

d computer instructions in the fractionation system data storage identifying fractionation zones and non-fractionation zones in the lateral pay zone and insert the fractionation zones as a three dimensional fractionation zones in the overlay;

e computer instructions in the fractionation system data storage identifying at least one well perforating gun location in at least one of the fractionation zones and to insert the at least one well perforating gun location as a three dimensional well perforating gun location in the overlay;

f computer instructions in the fractionation system data storage identifying at least one fractionation plug location for at least one of the fractionation zones and to insert the fractionation plug location as three dimensional fractionation plug locations in the overlay;

g computer instructions in the fractionation system data storage inserting into the overlay with the three dimensional fractionation zones, the three dimensional well perforating gun locations and the three dimensional fractionation plug locations into a web accessible executive dashboard, accessible with a plurality of client devices over a network to communicate with at least one user to stage the fractionation of the lateral pay zone, wherein the web accessible executive dashboard comprises:

(i) the overlay with the three dimensional fractionation zones, the three dimensional well perforating gun location and three dimensional fractionation plug locations;

(ii) additional well bore information;

(iii) additional stratigraphic information surrounding the lateral pay zone;

(iv) additional formation information for formations surrounding the lateral pay zone;

(v) start measured depths for each fractionation zone;

(vi) end measured depths for each fractionation zone; and (vii) well identification information;

h a first well perforating gun for positioning at the at least one well perforating gun location in one of the fractionation zones identified in the web accessible executive dashboard;

i a detonator to explode the first well perforating gun;

j a pump for hydraulically pumping particulate and water into the wellbore fractionating one of the fractionation zones; and k a plurality of fractionation plugs for insertion into the lateral pay zone after the well perforating gun starts production into the wellbore; wherein the system identifies fractionation zones using the overlay and other information in the web accessible executive dashboard for placement of well perforating guns in sequence in the lateral pay zone while identifying non-fractionation zones and identifies fractionation plug placement locations for accurately placing fractionation plugs to maximize production from the lateral pay zone.

2. The system of claim 1, further comprising computer instructions that expand, compress and rotate the overlay at least 360 degrees by a plurality of users.

3. The system of claim 1, further comprising computer instructions colorizing a location for a member of the group: a formation, the fractionation zone, the fractionation plug location, the well perforating gun location, and present a colorized formation, a colorized fractionation zone, a colorized fractionation plug location, a colorized well perforating gun location in the overlay.

4. The system of claim 3, further comprising an overlay insert colorization, wherein the colorized location corresponds to potential pay out, potential cost to fractionate, potential hazards, or combinations thereof.

5. The system of claim 1, further comprising computer instructions in the fractionation system data storage creating a two dimensional overlay of the wellbore profile of adjacent formations simultaneously with the overlay of the wellbore profile of adjacent formations in the web accessible executive dashboard provides continuous updates to the two dimensional overlay and the overlay based on event information input from users connected to the network as events occur.

6. The system of claim 1, further comprising computer instructions in the fractionation system data storage using at least two industry standard gateways simultaneously to provide the web accessible executive dashboard to different client devices with different client device protocols.

7. The system of claim 1, wherein the well identification information consists of:

a well location, a well name, and a completion team.

8. The system of claim 1, further comprising computer instructions in the fractionation system data storage displaying an alarm regarding hazards adjacent the lateral pay zone, provides a notice that the alarm has been transmitted to at least one client device of a user, provides a notice that the alarm has been received by at least one client device of a user, and re-transmit the alarm to a client device of a user while providing notice of retransmission on the web accessible executive dashboard that the alarm notice has been retransmitted.

9. The system of claim 1, wherein the stratigraphic cross section provided by the web accessible executive dashboard comprises:

a a start measured depth on the overlay;

b an ending measured depth on the overlay;

c a true vertical depth offset on the overlay; and d a dip on the overlay.

10. The system of claim 1, further comprising:

a computer instructions in the fractionation system data storage plotting an actual curve of the wellbore in the stratigraphic cross section and to plot a type log curve within in a graph for correlation of the actual curve to the type log curve;

b computer instructions in the fractionation system data storage plotting a portion of the actual curve within a portion of interest in the stratigraphic cross section versus a target relative depth scale;

c computer instructions in the fractionation system data storage calculating a change in a true vertical depth using the dip;

d computer instructions in the fractionation system data storage calculating the true vertical depth at the start measured depth for the stratigraphic cross section using an actual survey;

e computer instructions in the fractionation system data storage calculating the true vertical depth at a measured depth for a plurality of sampling data points along the actual curve using the actual survey;

f computer instructions in the fractionation system data storage calculating a change in the true vertical depth by determining a difference between the true vertical depth at the start measured depth and the true vertical depth at the measured depth of the plurality of sampling data points along the actual curve;

g computer instructions in the fractionation system data storage calculating a change in target relative depth by performing a summation of the change in the true vertical depth using the dip and the change in the true vertical depth;

h computer instructions in the fractionation system data storage calculating an X-axis value for the plot of the actual curve, wherein the X-axis value is calculated by multiplying an actual value for each of the plurality of sampling data points with an actual scale factor;

i computer instructions in the fractionation system data storage calculating a Y-axis value for the plot of the actual curve, wherein the Y-axis value is calculated by subtracting a starting target relative depth of the stratigraphic cross section from a change in target relative depth forming a difference, and then subtracting a true vertical depth shift from the difference; and j computer instructions in the fractionation system data storage displaying the plot of the portion of the actual curve versus the target relative depth scale simultaneously in a first relative matching graph and a second relative matching graph allowing the user to correlate the actual curve to the type log curve thereby forming an actual curve of the wellbore profile of adjacent formations for insertion into the overlay.

11. The system of claim 10, further comprising computer instructions in the fractionation system data storage enabling the web accessible executive dashboard to present formation or marker tops in the overlay.

12. A computer assisted method for fractionation of a well using a three dimensional wellbore profile of adjacent formations comprising using a processor which:

a uses wellbore profile of adjacent formations computer instructions in a fractionation system data storage with a fractionation system processor of a fractionation system wherein the fractionation system is in communication with a network instructing the fractional system processor to identify a wellbore profile of adjacent formations for a wellbore of a well of interest, wherein the wellbore profile of adjacent formations comprises measured depths, inclinations, azimuths, and gamma ray curves of the wellbore;

b uses computer instructions in the fractionation system data storage to instruct the fractional system processor to identify a lateral pay zone for the well of interest;

c uses computer instructions in the fractionation system data storage to instructing the fractional system processor to overlay the wellbore profile of adjacent formations over the lateral pay zone forming an overlay of the wellbore profile, of adjacent formations and wherein the overlay further comprises:

(i) a three dimensional presentation of a stratigraphic cross section;

(ii) a three dimensional presentation of formations in the stratigraphic cross section; and (iii) a three dimensional presentation of the lateral pay zone in the wellbore profile of adjacent formations;

d uses computer instructions in the fractionation system data storage to instructing the fractional system processor to identify a fractionation zone and a non-fractionation zone in the lateral pay zone and insert the fractionation zone as a three dimensional fractionation zones in the overlay;

e uses computer instructions in the fractionation system data storage instructing the fractional system processor to identify a well perforating gun location in the fractionation zones and to insert the well perforating gun location as a three dimensional well perforating gun location in the overlay;

f uses computer instructions in the fractionation system data storage instructing the fractional system processor to identify at least one fractionation plug location for the fractionation zone and to insert the fractionation plug location as a three dimensional fractionation plug location in the overlay;

g uses computer instructions in the fractionation system data storage to instructing the fractional system processor to insert into the overlay with the three dimensional fractionation zones, the three dimensional well perforating gun location and the three dimensional fractionation plug location into a web accessible executive dashboard accessible with a plurality of client devices over the network to communicate with at least one user involved with staging the fractionation of the lateral pay zone, and wherein the web accessible executive dashboard comprises:

(i) the overlay with the three dimensional fractionation zone, the three dimensional well perforating gun location, and the three dimensional fractionation plug location;

(ii) additional well bore information;

(iii) additional stratigraphic information related to the lateral pay zone;

(iv) additional formation information related to the lateral pay zone;

(v) a start measured depth for the fractionation zone;

(vi) an end measured depth for the fractionation zone; and (vii) well identification information;

h running a well perforating gun to a well perforating gun location in the fractionation zone identified on the web accessible executive dashboard;

i exploding the well perforating gun;

j hydraulically pumping particulate and water into the wellbore and fractionating the fractionation zone;

k placing a fractionation plug into the lateral pay zone at a fractionation plug location identified by the web accessible executive dashboard after production begins; and l repeating in series, in the lateral pay zone, for additional fractionation zones identified by the web accessible executive dashboard the placing of an additional well perforating gun at an additional well gun locations in sequence, exploding the additional well perforating gun, and inserting an additional fractionation plug as needed using the web accessible executive dashboard until the lateral pay zone has been fractionated for all fractionation zones identified by the web accessible executive dashboard while avoiding non-fractionation zones.

13. The computer assisted method of claim 12, wherein the processor further provides a display that enables a user to expand, compress and rotate the overlay 360 degrees.

14. The computer assisted method of claim 12, wherein the processor colorize colorizes a location for a member of the group: a formation, a fractionation zone, a fractionation plug location, well perforating gun location, and present the colorized formation, fractionation zone, fractionation plug location, well perforating gun location in the overlay.

15. The computer assisted method of claim 14, wherein the processor uses a color code for the colorization that relates a color to a member of the group consisting of: potential pay out zones adjacent the lateral pay zone, potential cost to fractionate a fractionation zone, potential hazards adjacent the lateral pay zone, or combinations thereof.

16. The computer assisted method of claim 15, wherein the processor uses computer instructions in the fractionation system data storage to provide a two dimensional overlay of the well bore profile simultaneously with the overlay of the wellbore profile of adjacent formations in the web accessible executive dashboard, which allow users of the web accessible executive dashboard to update each overlay as events occur.

17. The computer assisted method of claim 16, wherein the processor uses computer instructions in the fractionation system data storage to perform the steps:

a displaying an alarm identifying a hazard adjacent a lateral pay zone;

b providing a notice that the alarm has been transmitted to at least one user;

c providing a notice that the alarm has been received by at least one user; and d re-transmitting the alarm and provide notice on the web accessible executive dashboard that retransmission has occurred.

18. The computer assisted method of claim 17, comprising computer instructions in the fractionation system data storage instructing the processor to:

a present in the overlay a start measured depth;

b present in three dimensions on the overlay an ending measured depth;

c present in three dimensions on the overlay the true vertical depth offset; and d present in three dimensions on the overlay a dip.

* * * * *